(12) United States Patent
Nguyen et al.

(10) Patent No.: US 8,001,053 B2
(45) Date of Patent: *Aug. 16, 2011

(54) SYSTEM AND METHOD FOR RIGHTS OFFERING AND GRANTING USING SHARED STATE VARIABLES

(75) Inventors: Mai Nguyen, Buena Park, CA (US); Xin Wang, Torrance, CA (US); Eddie J. Chen, Rancho Palos Verdes, CA (US); Bijan Tadayon, Germantown, MD (US)

(73) Assignee: ContentGuard Holdings, Inc., Wilmington, DE (US)

( * ) Notice: Subject to any disclaimer, the term of this patent is extended or adjusted under 35 U.S.C. 154(b) by 278 days.

This patent is subject to a terminal disclaimer.

(21) Appl. No.: 10/956,070

(22) Filed: Oct. 4, 2004

(65) Prior Publication Data

US 2005/0137984 A1  Jun. 23, 2005

Related U.S. Application Data

(63) Continuation-in-part of application No. 10/162,212, filed on Jun. 5, 2002, which is a continuation-in-part of application No. 09/867,745, filed on May 31, 2001, now Pat. No. 6,754,642.

(60) Provisional application No. 60/296,113, filed on Jun. 7, 2001, provisional application No. 60/331,625, filed on Nov. 20, 2001, provisional application No. 60/331,624, filed on Nov. 20, 2001.

(51) Int. Cl.
*H04L 9/00* (2006.01)

(52) U.S. Cl. .............. 705/57; 705/51; 705/53; 705/59

(58) Field of Classification Search ............... 705/1, 54, 705/57

See application file for complete search history.

(56) References Cited

U.S. PATENT DOCUMENTS 3,263,158 A    7/1966   Janis
(Continued)

FOREIGN PATENT DOCUMENTS

BR    9810967 A    10/2001
(Continued)

OTHER PUBLICATIONS

Delaigle, "Digital Watermarking," Spie Conference in Optical Security and Counterfeit Deterrence Techniques, San Jose, CA (Feb. 1996).

(Continued)

*Primary Examiner* — Evens J Augustin
(74) *Attorney, Agent, or Firm* — Reed Smith LLP; Marc S. Kaufman; Stephen M. Hertzler

(57) ABSTRACT

A method, system and device for sharing rights adapted to be associated with items, the method and system including generating at least one of usage rights and meta-rights for the items; defining, via the usage rights, a manner of use for the items; and defining, via the meta-rights, a manner of rights transfer for the items. The device including receiving at least one of usage rights and meta-rights for the items; interpreting, via the usage rights, a manner of use for the items; and interpreting, via the meta-rights, a manner of rights transfer for the items. The usage rights or the meta-rights include at least one state variable that is shared by one or more rights.

35 Claims, 17 Drawing Sheets

U.S. PATENT DOCUMENTS

| | | |
|---|---|---|
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,200,700 A | 4/1980 | Mäder |
| 4,220,991 A | 9/1980 | Hamano et al. |
| 4,278,837 A | 7/1981 | Best |
| 4,323,921 A | 4/1982 | Guillou |
| 4,361,851 A | 11/1982 | Asip et al. |
| 4,423,287 A | 12/1983 | Zeidler |
| 4,429,385 A | 1/1984 | Cichelli et al. |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,658,093 A | 4/1987 | Hellman |
| 4,713,753 A | 12/1987 | Boebert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nagel et al. |
| 5,410,598 A | 4/1995 | Shear |
| 5,412,717 A | 5/1995 | Fischer |
| 5,414,852 A | 5/1995 | Kramer et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A * | 5/1997 | Stefik et al. .................. 705/54 |
| 5,633,932 A | 5/1997 | Davis et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,671,412 A | 9/1997 | Christiano |
| 5,708,709 A | 1/1998 | Rose |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,758,069 A | 5/1998 | Olsen |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,787,172 A | 7/1998 | Arnold |
| 5,790,664 A | 8/1998 | Coley et al. |
| 5,790,677 A | 8/1998 | Fox et al. |
| 5,794,207 A | 8/1998 | Walker et al. |
| 5,812,664 A | 9/1998 | Bernobich et al. |
| 5,825,876 A | 10/1998 | Peterson |
| 5,825,879 A | 10/1998 | Davis |
| 5,825,892 A | 10/1998 | Braudaway et al. |
| 5,838,792 A | 11/1998 | Ganesan |
| 5,848,154 A | 12/1998 | Nishio et al. |
| 5,848,378 A | 12/1998 | Shelton et al. |
| 5,850,443 A | 12/1998 | Van Oorschot et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,925,127 A | 7/1999 | Ahmad |

| Patent Number | Date | Inventor(s) | Ref |
|---|---|---|---|
| 5,933,498 A | 8/1999 | Schneck et al. | |
| 5,940,504 A | 8/1999 | Griswold | |
| 5,943,422 A | 8/1999 | Van Wie et al. | |
| 5,949,876 A | 9/1999 | Ginter et al. | |
| 5,982,891 A | 11/1999 | Ginter et al. | |
| 5,987,134 A | 11/1999 | Shin et al. | |
| 5,991,306 A | 11/1999 | Burns et al. | |
| 5,999,624 A | 12/1999 | Hopkins | |
| 5,999,949 A | 12/1999 | Crandall | |
| 6,006,332 A | 12/1999 | Rabne et al. | |
| 6,009,401 A | 12/1999 | Horstmann | |
| 6,020,882 A | 2/2000 | Kinghorn et al. | |
| 6,047,067 A | 4/2000 | Rosen | |
| 6,056,786 A | 5/2000 | Rivera et al. | |
| 6,073,234 A | 6/2000 | Kigo et al. | |
| 6,091,777 A | 7/2000 | Guetz et al. | |
| 6,112,181 A | 8/2000 | Shear et al. | |
| 6,112,239 A | 8/2000 | Kenner et al. | |
| 6,115,471 A | 9/2000 | Oki et al. | |
| 6,135,646 A | 10/2000 | Kahn et al. | |
| 6,138,119 A | 10/2000 | Hall et al. | |
| 6,141,754 A | 10/2000 | Choy | |
| 6,157,719 A | 12/2000 | Wasilewski et al. | |
| 6,157,721 A | 12/2000 | Shear et al. | |
| 6,169,976 B1 | 1/2001 | Colosso | |
| 6,185,683 B1 | 2/2001 | Ginter et al. | |
| 6,189,037 B1 | 2/2001 | Adams et al. | |
| 6,189,146 B1 | 2/2001 | Misra et al. | |
| 6,209,092 B1 | 3/2001 | Linnartz | |
| 6,216,112 B1 | 4/2001 | Fuller et al. | |
| 6,219,652 B1 | 4/2001 | Carter et al. | |
| 6,226,618 B1* | 5/2001 | Downs et al. | 705/51 |
| 6,233,684 B1* | 5/2001 | Stefik et al. | 713/176 |
| 6,236,971 B1 | 5/2001 | Stefik et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,301,660 B1 | 10/2001 | Benson | |
| 6,307,939 B1 | 10/2001 | Vigarie | |
| 6,327,652 B1 | 12/2001 | England et al. | |
| 6,330,670 B1 | 12/2001 | England et al. | |
| 6,345,256 B1 | 2/2002 | Milsted et al. | |
| 6,353,888 B1 | 3/2002 | Kakehi et al. | |
| 6,363,488 B1 | 3/2002 | Ginter et al. | |
| 6,389,402 B1 | 5/2002 | Ginter et al. | |
| 6,397,333 B1 | 5/2002 | Söhne et al. | |
| 6,401,211 B1 | 6/2002 | Brezak, Jr. et al. | |
| 6,405,369 B1 | 6/2002 | Tsuria | |
| 6,424,717 B1 | 7/2002 | Pinder et al. | |
| 6,424,947 B1 | 7/2002 | Tsuria et al. | |
| 6,442,517 B1* | 8/2002 | Miller et al. | 704/201 |
| 6,487,659 B1 | 11/2002 | Kigo et al. | |
| 6,516,052 B2 | 2/2003 | Voudouris | |
| 6,516,413 B1 | 2/2003 | Aratani et al. | |
| 6,523,745 B1 | 2/2003 | Tamori | |
| 6,636,966 B1* | 10/2003 | Lee et al. | 713/165 |
| 6,697,944 B1* | 2/2004 | Jones et al. | 713/168 |
| 6,772,340 B1* | 8/2004 | Peinado et al. | 713/168 |
| 6,775,655 B1* | 8/2004 | Peinado et al. | 705/59 |
| 6,796,555 B1 | 9/2004 | Blahut | |
| 6,816,596 B1* | 11/2004 | Peinado et al. | 380/277 |
| 6,829,708 B1* | 12/2004 | Peinado et al. | 713/156 |
| 6,850,252 B1* | 2/2005 | Hoffberg | 715/716 |
| 6,885,748 B1* | 4/2005 | Wang | 380/201 |
| 6,947,571 B1* | 9/2005 | Rhoads et al. | 382/100 |
| 6,947,910 B2* | 9/2005 | Hsu et al. | 705/57 |
| 6,973,444 B1* | 12/2005 | Blinn et al. | 705/51 |
| 6,985,588 B1* | 1/2006 | Glick et al. | 380/258 |
| 6,993,131 B1* | 1/2006 | Meyers | 380/201 |
| 7,010,808 B1* | 3/2006 | Leung et al. | 726/26 |
| 7,024,393 B1* | 4/2006 | Peinado et al. | 705/59 |
| 7,039,615 B1* | 5/2006 | Gajjala et al. | 705/59 |
| 7,051,005 B1* | 5/2006 | Peinado et al. | 705/57 |
| 7,065,507 B2* | 6/2006 | Mohammed et al. | 705/59 |
| 7,068,787 B1* | 6/2006 | Ta et al. | 380/240 |
| 7,103,574 B1* | 9/2006 | Peinado et al. | 705/51 |
| 7,120,254 B2* | 10/2006 | Glick et al. | 380/258 |
| 7,134,144 B2* | 11/2006 | McKune | 726/26 |
| 7,136,838 B1* | 11/2006 | Peinado et al. | 705/59 |
| 7,149,722 B1* | 12/2006 | Abburi | 705/59 |
| 7,181,438 B1* | 2/2007 | Szabo | 1/1 |
| 7,233,948 B1* | 6/2007 | Shamoon et al. | 1/1 |
| 7,319,759 B1* | 1/2008 | Peinado et al. | 380/277 |
| 2001/0009026 A1 | 7/2001 | Terao et al. | |
| 2001/0011276 A1 | 8/2001 | Durst, Jr. et al. | |
| 2001/0014206 A1 | 8/2001 | Artigalas et al. | |
| 2001/0032312 A1* | 10/2001 | Runje et al. | 713/172 |
| 2001/0037467 A1 | 11/2001 | O'Toole, Jr. et al. | |
| 2001/0039659 A1 | 11/2001 | Simmons et al. | |
| 2001/0051996 A1* | 12/2001 | Cooper et al. | 709/217 |
| 2002/0001387 A1 | 1/2002 | Dillon | |
| 2002/0019814 A1* | 2/2002 | Ganesan | 705/59 |
| 2002/0035618 A1 | 3/2002 | Mendez et al. | |
| 2002/0044658 A1 | 4/2002 | Wasilewski et al. | |
| 2002/0051540 A1* | 5/2002 | Glick et al. | 380/258 |
| 2002/0056118 A1 | 5/2002 | Hunter et al. | |
| 2002/0069282 A1 | 6/2002 | Reisman | |
| 2002/0099948 A1 | 7/2002 | Kocher et al. | |
| 2002/0127423 A1 | 9/2002 | Kayanakis | |
| 2002/0141584 A1* | 10/2002 | Razdan et al. | 380/203 |
| 2002/0169974 A1* | 11/2002 | McKune | 713/200 |
| 2003/0028488 A1* | 2/2003 | Mohammed et al. | 705/59 |
| 2003/0066884 A1* | 4/2003 | Reddy et al. | 235/382.5 |
| 2003/0097567 A1 | 5/2003 | Terao et al. | |
| 2004/0052370 A1 | 3/2004 | Katznelson | |
| 2004/0172552 A1 | 9/2004 | Boyles et al. | |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 262 025 A2 | 3/1988 |
| EP | 0 332 304 A2 | 9/1989 |
| EP | 0 332 304 A3 | 9/1989 |
| EP | 0 332 707 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A | 6/1996 |
| EP | 0 715 243 A1 | 6/1996 |
| EP | 0 715 244 A | 6/1996 |
| EP | 0 715 244 A1 | 6/1996 |
| EP | 0 715 245 A1 | 6/1996 |
| EP | 0 715 246 A | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 041 823 A2 | 10/2000 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3-063717 A | 3/1991 |
| JP | 04-369068 | 12/1992 |
| JP | 5-100939 | 4/1993 |
| JP | 5168039 A2 | 7/1993 |
| JP | 05-268415 | 10/1993 |
| JP | 6-131371 A | 5/1994 |

| | | |
|---|---|---|
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 0 715 241 | 6/1996 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |
| WO | WO 93/01550 | 1/1993 |
| WO | WO 93/01550 A1 | 1/1993 |
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/04727 | 1/2000 |
| WO | WO 00/05898 A2 | 2/2000 |
| WO | WO 00/08909 A | 2/2000 |
| WO | WO 00/46994 A1 | 8/2000 |
| WO | WO 00/59152 | 10/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01 13198 A | 1/2001 |
| WO | WO 01/24530 A2 | 4/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

Perritt, "Technologies Strategies for Protecting Intellectual Property in the Networked Multimedia Environment," Knowbots, Permissions Headers and Contract Law (Apr. 2-3, 1993).
Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" DRAFT (Online) (Nov. 2, 1997) XP002239619 Retrieved from the Internet.
No Author, "Capability- and Object-Based Systems Concepts," Capability-Based Computer Systems, pp. 1-19 (no date).
Cox, "Superdistribution" Wired Magazine (Sep. 1994) XP002233405 URL:http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Iannella, ed., Open Digital Rights Language (ODRL), pp. 1-31 (Nov. 21, 2000).
Kahle, wais.concepts.txt, Wide Area Information Server Concepts, Thinking Machines Version 4, Draft, pp. 1-18 (Nov. 3, 1989).
Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).
Kohl et al, Network Working Group Request for Comments: 1510, pp. 1-112 (Sep. 1993).
Lee et al, CDMA Systems Engineering Handbook (1998) [excerpts but not all pages numbered].
Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.
Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.
Microsoft Word, Users Guide, Version 6.0, pp. 487-489, 549-555, 560-564, 572-575, 599-613, 616-631 (1993).
Ojanperä and Prasad, eds., Wideband CDMA for Third Generation Mobile Communications (1998) [excerpts but not all pages numbered].
Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).
Raggett, (Hewlett Packard), "HTML+(Hypertext markup language)," pp. 1-31 (Jul. 12, 1993) URL:http://citeseer.ist.psu.edu/correct/340709.
Samuelson et al, "Intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pages, pp. 469-472, 593-594 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
AH Digital Audio and Video Series, "DTV Receivers and Measurements," Understanding Digital Terrestrial Broadcasting, pp. 159-164 (no date).
O'Driscoll, The Essential Guide to Digital Set—Top Boxes and Interactive TV, pp. 6-24 (no date).
Ius Mentis, "The ElGamal Public Key System," pp. 1-2 (Oct. 1, 2005) online at http://www.iusmentis.com/technology/encyrption/elgamal/.
Schneier, "Crypto Bibliography," Index of Crypto Papers Available Online, pp. 1-2 (online) (no date).
No Author, No Title, pp. 344-355 (no date).
No Author, "Part Four Networks," No Title, pp. 639-714 (no date).
Microsoft Word User's Guide, pp. 773-774, 315-316, 487-489, 561-564, 744, 624-633 (1993).

No Author, "What is the ElGarnal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary. thefreedictionary.com, www.nist.gov, en.wikipedia.org, www.cni. org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).

Johnson et al., "A Secure Distributed Capability Based System," Proceedings of the 1985 ACM Annual Conference on the Range of Computing: MID-80's Perspective: MID-80's Perspective *Association for Computing Machinery* pp. 392-402 (1985).

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119-131, 1986, Comput. & Graphics, vol. 10, No. 2.

Mori, R. et al., "Superdistribution: The Concept and the Architecture", pp. 1133-1146, 1990. The Transactions of the IEICE, Vo. E 73, No. 7, Tokyo, JP.

Weber, R., "Metering Technologies for Digital Intellectual Property", pp. 1-29, Oct. 1994, A Report to the International Federation of Reproduction Rights Organizations.

Clark, P.C. et al., "Bits: A Smartcard protected Operating System", pp. 66-70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1-19, Aug. 1992, Corporation for National Research Initiatives, Virginia.

Hilts, P. et al., "Books While U Wait", pp. 48-50, Jan. 3, 1994, Publishers Weekly.

Strattner, A, "Cash Register on a Chip may Revolutionaize Software Pricing and Distribution; Wave Systems Corp.", pp. 1-3, Apr. 1994, Computer Shopper, vol. 14, No. 4, ISSN 0886-0556.

O'Conner, M., "New Distribution Option for Electronic Publishers; iOpener Data Encryption and Metering System for CD-ROM use; Column", pp. 1-6, Mar. 1994, CD-ROM Professional, vol. 7, No. 2, ISSN: 1409-0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network", pp. 9-20, Jan. 1994, IMA Intellectual Property Project Proceedings, vol. 1, Issue 1.

Perrit, Jr., H., "Permission Headers and Contract Law", pp. 27-48, Jan. 1994, IMA Intellectual Property Project Proceedings, vol. 1, Issue 1.

Upthegrove, L., "Intellectual Property Header Descriptors: A Dynamic Approach", pp. 63-66, Jan. 1994, IMA Intellectual Property Proceedings, vol. 1, Issue 1.

Sirbu, M., "Internet Billing Service Design and prototype Implementation", pp. 67-80, Jan. 1994, IMA Intellectual Property Project Proceedings, vol. 1, Issue 1.

Simmell, S. et al., "Metering and Licensing of Resources: Kala's General Purpose Approach", pp. 81-110, Jan. 1994, IMA Intellectual Property Project Proceedings, vol. 1, Issue 1.

Kahn, R., "Deposit, Registration and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", pp. 1-24, 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publication", pp. 2-35, Feb. 8, 1995, Internet Dreams: Archetypes, Myths and Metaphors.

Henry H. Perritt, Jr., "Technological Strategies for Protecting Intellectual Property in the Networked Multimedia Environment", Apr. 2-3, 1993, Knowbots, Permissions Headers & Contract Law.

Perritt, "Technologies Strategies for Protecting IP in the Networked Multimedia Environment", Apr. 2-3, 1993, Knowbot Permissions.

Delaigle, "Digital Watermarking", Spie Conference in Optical Security and Counterfeit Deterrence Techniques, San Jose, CA Feb. 1996, vol. 2659 pp. 99-110.

"The C++ Programming Language—Second Edition", Bjarne Stroustrup, Addison-Wesley, ISBN 0-201-53992-6, 1991.

* cited by examiner

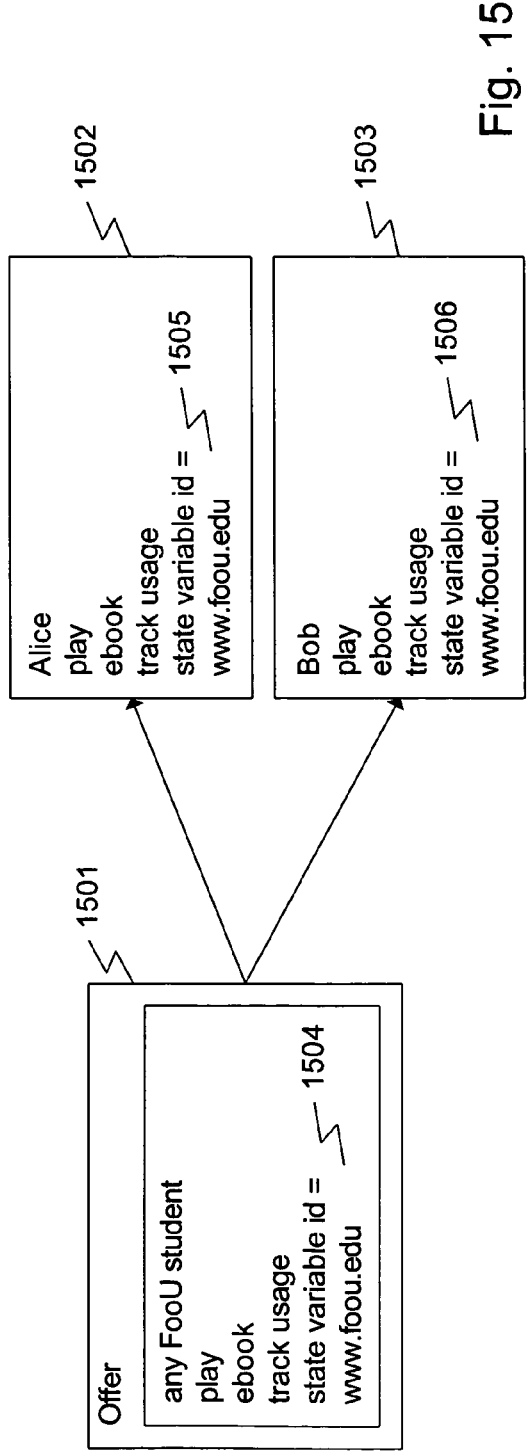
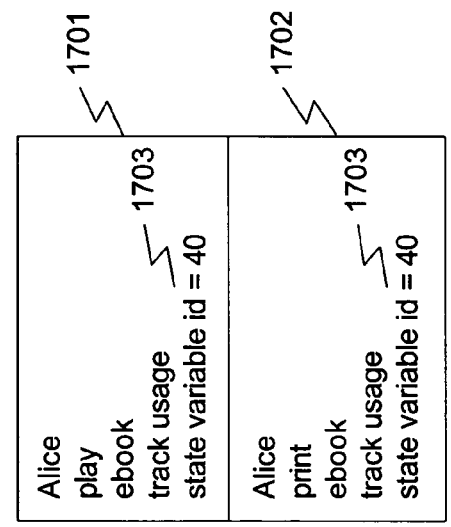
Fig. 15
Fig. 17

SYSTEM AND METHOD FOR RIGHTS OFFERING AND GRANTING USING SHARED STATE VARIABLES

RELATED APPLICATION DATA

This application is a continuation-in-part application of co-pending application Ser. No. 10/162,212 filed on Jun. 5, 2002, which is a continuation-in-part application of application Ser. No. 09/867,745 filed on May 31, 2001, and which claims benefit from U.S. provisional application Ser. No. 60/296,113, filed in Jun. 7, 2001, U.S. provisional application, Ser. No. 60/331,625 filed in Nov. 20, 2001, and U.S. provisional application Ser. No. 60/331,624 filed on Nov. 20, 2001, the entire disclosures of all of which are hereby incorporated by reference herein.

FIELD OF THE INVENTION

The present invention generally relates to offering and granting of rights and more particularly to a method, system and device for offering and granting of rights using shared state variables.

BACKGROUND OF THE INVENTION

The digital age has greatly increased concerns about ownership, access, and control of copyrighted information, restricted services and valuable resources. Rapid evolution and wide deployment has occurred for computers, and other electronic devices such as cellular phones, pagers, PDAs, and e-book readers, and these devices are interconnected through communication links including the Internet, intranets and other networks. These interconnected devices are especially conducive to publication of content, offering of services and availability of resources electronically.

One of the most important issues impeding the widespread distribution of digital works (i.e. documents or other content in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM System. For example, authentication, authorization, accounting, payment and financial clearing, rights specification, rights verification, rights enforcement, and document protection issues should be addressed. U.S. Pat. Nos. 5,530,235, 5,634,012, 5,715,403, 5,638,443, and 5,629,980, the disclosures of which are incorporated herein by reference, disclose DRM systems addressing these issues.

Two basic DRM schemes have been employed, secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as Cryptolopes and Digiboxes fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems, such as PC's and workstations using browsers to access the Web, will be the dominant systems used to access digital works. In this sense, existing computing environments such as PC's and workstations equipped with popular operating systems (e.g., Windows, Linux, and UNIX) and rendering applications, such as browsers, are not trusted systems and cannot be made trusted without significantly altering their architectures. Of course, alteration of the architecture defeats a primary purpose of the Web, i.e. flexibility and compatibility.

Some DRM systems allow content owners to specify usage rights and conditions, and associate them with content. These usage rights control how the recipient thereof can use the content. Usually after a content distributor or consumer has completed selecting and ordering specific content, the content is delivered either electronically from some content repository or via a conventional distribution channel to the recipient, such as tangible media sent via a common carrier. Corresponding DRM systems used by the recipient, for example the distributor or consumer, will then interpret the rights and conditions associated with the content, and use them to control how the content is distributed and/or used. Examples of usage rights include view, print and extract the content, and distribute, repackage and loan content. Associated conditions may include any term upon which the rights may be contingent such as payment, identification, time period, or the like.

U.S. Pat. No. 5,634,012, discloses a system for controlling the distribution of digital documents. Each rendering device has a repository associated therewith. A predetermined set of usage transaction steps define a protocol used by the repositories for enforcing usage rights associated with a document. Usage rights persist with the document content. The usage rights can permit various manners of use such as, viewing only, use once, distribution, and the like. Usage rights can be contingent on payment or other conditions.

However, there are limitations associated with the above-mentioned paradigms wherein only usage rights and conditions associated with content are specified by content owners or other grantors of rights. Once purchased by an end user, a consumer, or a distributor, of content along with its associated usage rights and conditions has no means to be legally passed on to a next recipient in a distribution chain. Further the associated usage rights have no provision for specifying rights to derive other rights, i.e. Rights to modify, transfer, offer, grant, obtain, transfer, delegate, track, surrender, exchange, transport, exercise, revoke, or the like. Common content distribution models often include a multi-tier distribution and usage chain. Known DRM systems do not facilitate the ability to prescribe rights and conditions for all participants along a content distribution and usage chain. Therefore, it is difficult for a content owner to commercially exploit content unless the owner has a relationship with each party in the distribution chain.

SUMMARY OF THE INVENTION

Exemplary aspects of the present invention include a method, system and device for sharing rights adapted to be associated with items, the method and system including generating at least one of usage rights and meta-rights for the items; defining, via the usage rights, a manner of use for the items; and defining, via the meta-rights, a manner of rights transfer for the items. The device including receiving at least one of usage rights and meta-rights for the items; interpreting, via the usage rights, a manner of use for the items; and interpreting, via the meta-rights, a manner of rights transfer for the items. The usage rights or the meta-rights include at least one state variable that is shared by one or more rights.

Still other aspects, features, and advantages of the present invention are readily apparent from the following detailed description, simply by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

Exemplary embodiments of this invention will be described in detail, with reference to the attached drawings in which:

FIG. 15 illustrates employing of a state variable in deriving rights that are shared among a known set of rights recipients;

FIG. 17 illustrates employing of a state variable in maintaining a state shared by multiple rights;

DETAILED DESCRIPTION

Prior to providing detailed description of the apparatus and method for offering and granting rights, a description of a DRM system that can be utilized to specify and enforce usage rights and meta-rights for specific content, services, or other items is first described below.

Figure 9:
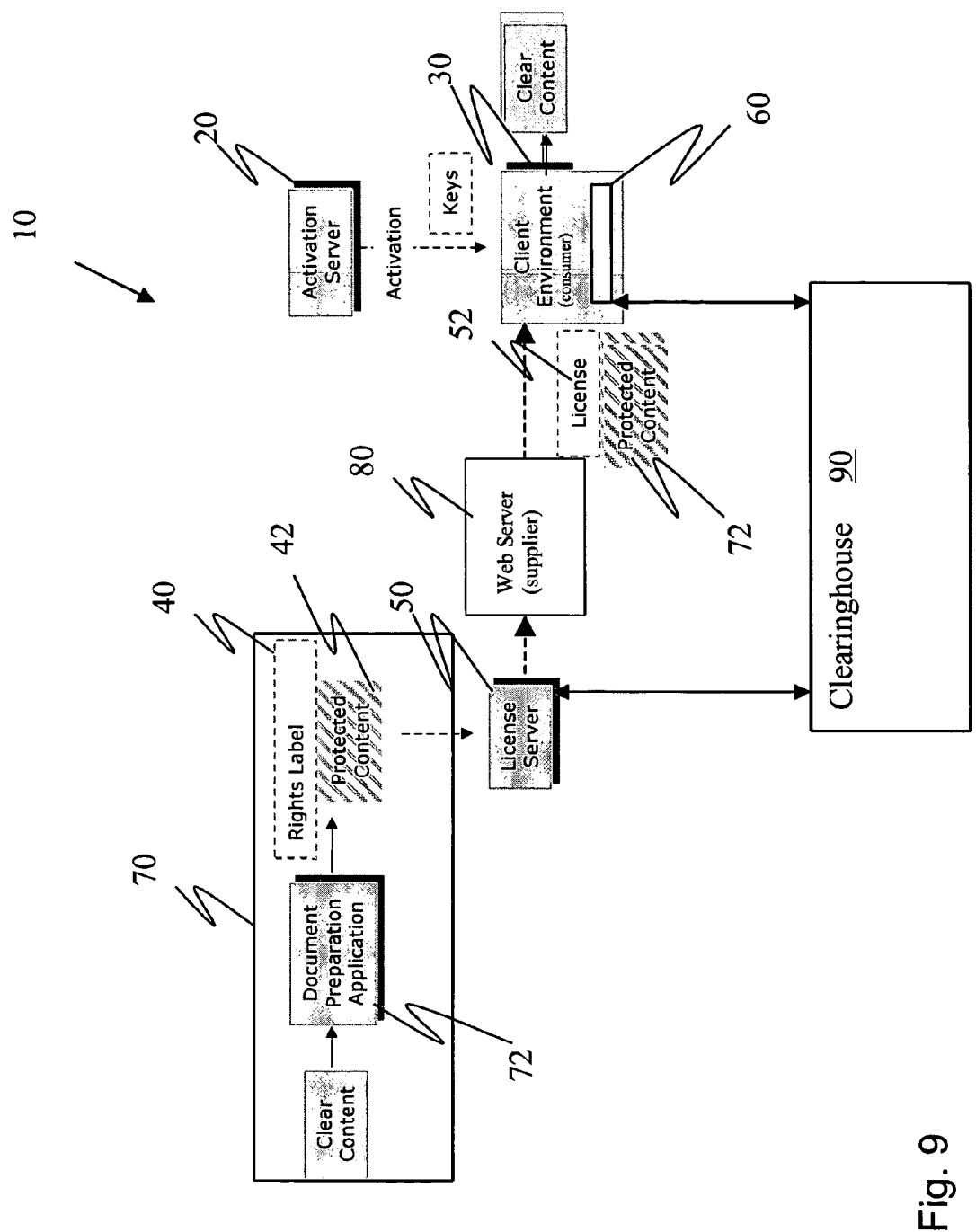
FIG. 9 is block diagram of a DRM system that may be utilized in connection with the preferred embodiment.

FIG. 9 illustrates DRM System 10 that includes a user activation component, in the form of activation server 20, that issues public and private key pairs, or other identification mechanisms, to content users in a protected fashion, as is well known. Typically, when a user uses DRM system 10 for the first time, the user installs software that works with, or includes, a rendering application for a particular content format. The software is installed in client environment 30, a computer associated with the content recipient, for example. The software is part of DRM 10 system and is used to enforce usage rights for protected content. During the activation process, some information is exchanged between activation server 20 and client environment 30. Client component 60 preferably is tamper resistant and contains the set of public and private keys issued by activation server 20 as well as other components, such as rendering components for example.

Rights label 40 is associated with content 42 and specifies usage rights and meta-rights that are available to a recipient, i.e. a consumer of rights, when corresponding conditions are satisfied. License Server 50 manages the encryption keys and issues licenses 52 for protected content 42. Licenses 52 embody the actual granting of rights, including usage rights and meta-rights, to an end user. For example, rights offer 40 may permit a user to view content for a fee of five dollars and print content for a fee of ten dollars, or it may permit a user to offer rights to another user, for example, by utilizing the concept of meta-rights described below. License 52 can be issued for the view right when the five dollar fee has been paid. Client component 60 interprets and enforces the rights, including usage rights and meta-rights, that have been specified in the license. Rights label 40 and license 52 are described in detail below.

Figure 11:
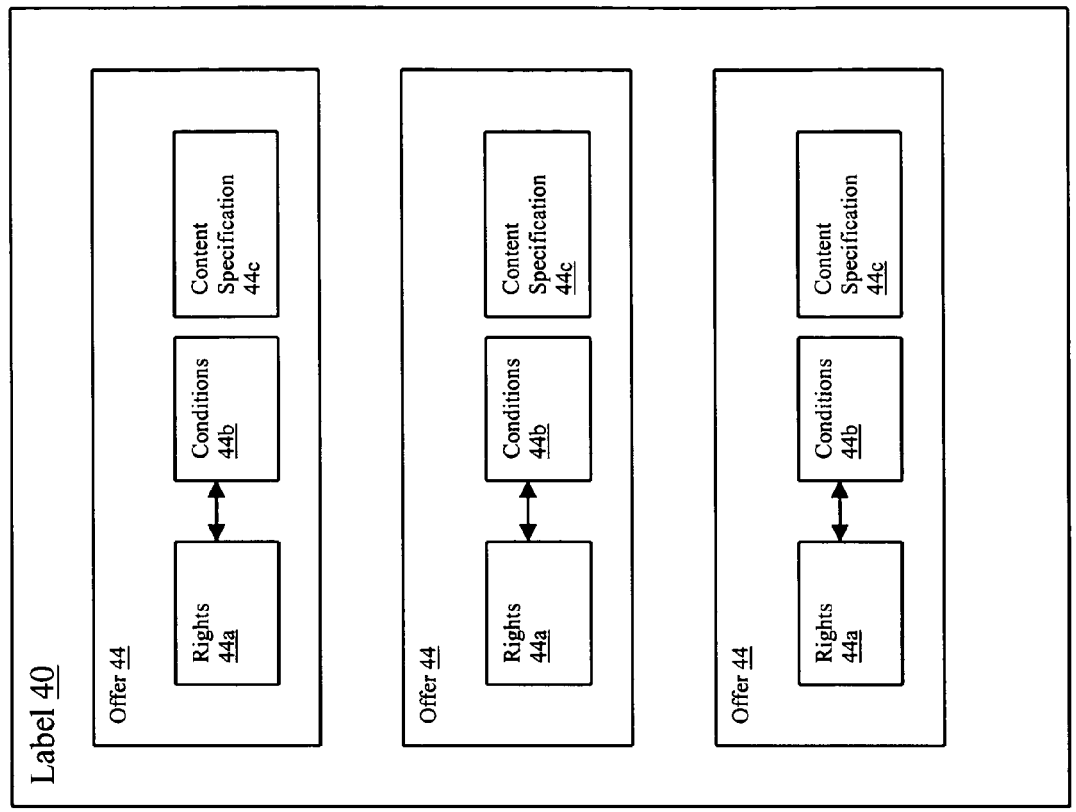
FIG. 11 is a schematic illustration of a rights label of the preferred embodiment.

FIG. 11 illustrates rights label 40 in accordance with the preferred embodiment. Rights label 40 includes plural rights options 44. Each rights option 44 includes usage rights 44a, conditions 44b, and content specification 44c. Content specification 44c can include any mechanism for referencing, calling, locating, or otherwise specifying content 42 associated with rights offer 44.

Figure 10:
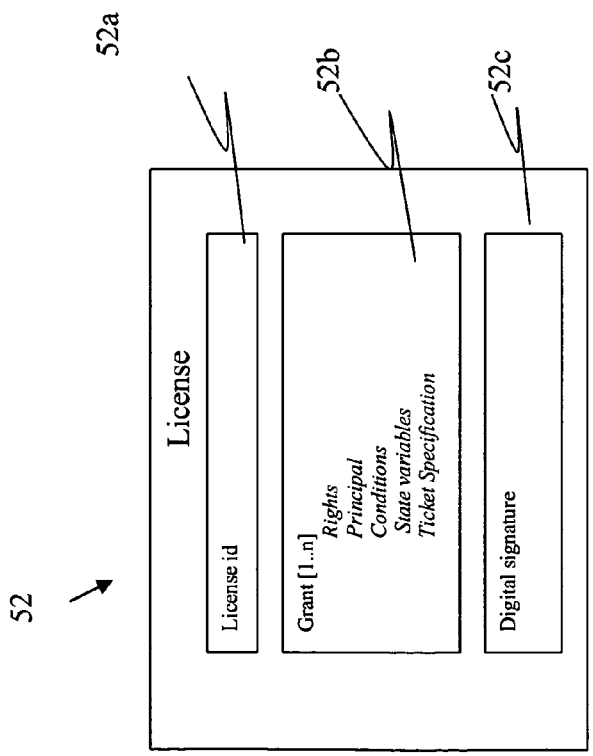
FIG. 10 is a block diagram of an exemplary structure of a license containing usage rights and meta-rights of the preferred embodiment.

As shown in FIG. 10, license 52 includes license 52a, grant 52b, and digital signature 52c. Grant 52b includes granted usage rights and/or meta-rights selected from label. The structure of the grant also includes one or more principals, to whom the specified usage rights and/or meta-rights are granted, a list of conditions, and state variables required to enforce the license. Like usage rights, access and exercise of the granted meta-rights are controlled by the condition list and state variables as described below.

Clear (unprotected) content can be prepared with document preparation application 72 installed on computer 70 associated with a content publisher, a content distributor, a content service provider, or any other party. Preparation of content consists of specifying the usage rights, meta-rights, and conditions under which content 42 can be used and distributed, associating rights label 40 with content 42 and protecting content 42 with some crypto algorithm. A rights language such as XrML can be used to specify the rights and conditions. However, the usage rights and meta-rights can be specified in any manner. Also, the rights can be in the form of a pre-defined specification or template that is merely associated with the content. Accordingly, the process of specifying rights refers to any process for associating rights with content. Rights label 40 associated with content 42 and the encryption key used to encrypt the content can be transmitted to license server 50.

Rights can specify transfer rights, such as distribution rights, and can permit granting of rights to others or the derivation of rights. Such rights are referred to as "meta-rights". Meta-rights are the rights that one has to manipulate, modify, or otherwise derive other meta-rights or usage rights. Meta-rights can be thought of as usage rights to usage rights. Meta-rights can include rights to offer, grant, obtain, transfer, delegate, track, surrender, exchange, and revoke usage rights to/from others. Meta-rights can include the rights to modify any of the conditions associated with other rights. For example, a meta-right may be the right to extend or reduce the scope of a particular right. A meta-right may also be the right to extend or reduce the validation period of a right.

Often, conditions must be satisfied in order to exercise the manner of use in a specified right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Rights and conditions can exist as separate entities or can be combined.

State variables track potentially dynamic states conditions. State variables are variables having values that represent status of an item, usage rights, license or other dynamic conditions. State variables can be tracked, by clearinghouse 90 license or server 30 another device, based on identification mechanisms in license 52. Further, the value of state variables can be used in a condition. For example, a usage right can be the right to print content 42 three times. Each time the usage right is exercised, the value of the state variable "number of prints" is incremented. In this example, when the value of the state variable is three, the condition is not longer satisfied and content 42 cannot be printed. Another example of a state variable is time. A condition of license 52 may require that content 42 is printed within thirty days. A state variable can be used to track the expiration of thirty days. Further, the state of a right can be tracked as a collection of state variables. The collection of the change is the state of a usage right represents the usage history of that right.

A typical workflow for DRM system 10 is described below. A recipient, such as a user, operating within client environment 30 is activated for receiving content by activation server 20. This results in a public-private key pair (and some user/machine specific information) being downloaded to client environment 30 in the form of client software component 60 in a known manner. This activation process can be accomplished at any time prior to the issuing of a license.

When a user wishes to use protected content 42, the user makes a request for the content 42. For example, a user might browse a Web site running on Web server 80 associated with a grantor of rights such as a content distributor, using a browser installed in client environment 30, and attempt to download protected content 42. During this process, the user may go through a series of steps possibly including a fee transaction (as in the sale of content) or other transactions (such as collection of information). When the appropriate conditions and other prerequisites, such as the collection of a fee and verification that the user has been activated, are satisfied, Web server 80 contacts license server 50 through a secure communications channel, such as a channel using a Secure Sockets Layer (SSL). License server 50 then generates license 52 for the content and Web server 80 causes both protected content 42 and license 52 to be downloaded. License 52 can be downloaded from license server 50 or an associated device. Content 42 can be downloaded from computer 70 associated with a publisher, distributor, or other party.

Client component 60 in client environment 30 will then proceed to interpret license 52 and allow use of content 42 based on the rights and conditions specified in license 52. The interpretation and enforcement of usage rights are well known generally. The steps above may take place sequentially or approximately simultaneously or in various order.

DRM system 10 addresses security aspects of protecting content 42. In particular, DRM system 10 may authenticate license 52 that has been issued by license server 50. One way to accomplish such authentication is for application 60 to determine if the licenses can be trusted. In other words, application 60 has the capability to verify and validate the cryptographic signature of digital signature 52c, or other identifying characteristic of the license. During the activation step described above, both client environment 30 and license server 50 receive a set of keys in a tamper-resistant software "package" that also includes other components, such as the necessary components for activated client environment 30 to verify signature 52 of license 52 in a known manner. Of course, the example above is merely one way to effect a DRM system. For example, the license and content can be distributed from different entities. Also, rights offer 40 can be associated with content by a party other than the party preparing the content. Also, clearinghouse 90 can be used to process payment transactions and verify payment prior to issuing a license.

For any set of rights, there are two kinds of entities involved, the "supplier" and the "consumer". The function of the supplier is to offer, and possibly grant, the rights, and the function of the consumer is to select, and possibly exercise the rights. Both the supplier and consumer may actually represent two or more entities. In general, multiple entities may collectively make an offer and grant rights to multiple entities. The supplier and consumer represent any two entities in the content value chain that have a direct relationship with each other regarding the granting of rights. At the beginning of the value chain, the supplier and consumer may be author and publisher. Going down along the value chain, the supplier and consumer may be a publisher and another publisher (for content aggregation), a publisher and distributor (for content distribution), a distributor and another distributor (for multi-tier content distribution), a distributor and a retailer (for content retailing), a retailer and a consumer (for content consumption), and a consumer and another consumer (for content supper-distribution or personal lending).

An "offer of rights" or "rights offer" expresses how a consumer (e.g. a content distributor or user) can acquire a particular instance of content together with its associated usage rights and/or meta-rights. An offer may or may not contain financial terms. An offer is an expression of mere willingness to commerce negotiation and also an expression of willingness to grant on terms stated. An offer may be expressed in the form of a rights label. A "consideration of rights" is a process as part of the rights granting in which the rights consumer has examined the rights being offered and possibly bargained them and associated terms and conditions. A "choice of rights" is a selection of rights and their associated terms and conditions from a rights offer. It indicates the intent of the consumer to accept these rights and the corresponding terms and conditions. For example, selection can comprise selecting one option 44 from label 40. "Customization of rights" is a process as part of the rights granting in which the rights supplier assembles rights and terms and conditions based on a choice of the rights consumer. The output of this process can be a draft license to be accepted by the rights consumer. A "license of rights" is an expression of rights and possibly conditions accepted and agreed upon by the rights supplier and consumer. It is the output of the rights offering and granting process. A license is a grant to exercise the rights that govern the usage (possibly including further distribution) of content or other items.

As described above, a rights label, such as rights label 40, may contain a number of options 44 allowing the consumer to make a selection and conduct negotiation (if permitted), while license 52 contains rights the consumer has selected and accepted. Note that the accepted rights may include a right to present offers to others or make selections of offers.

Figure 1:
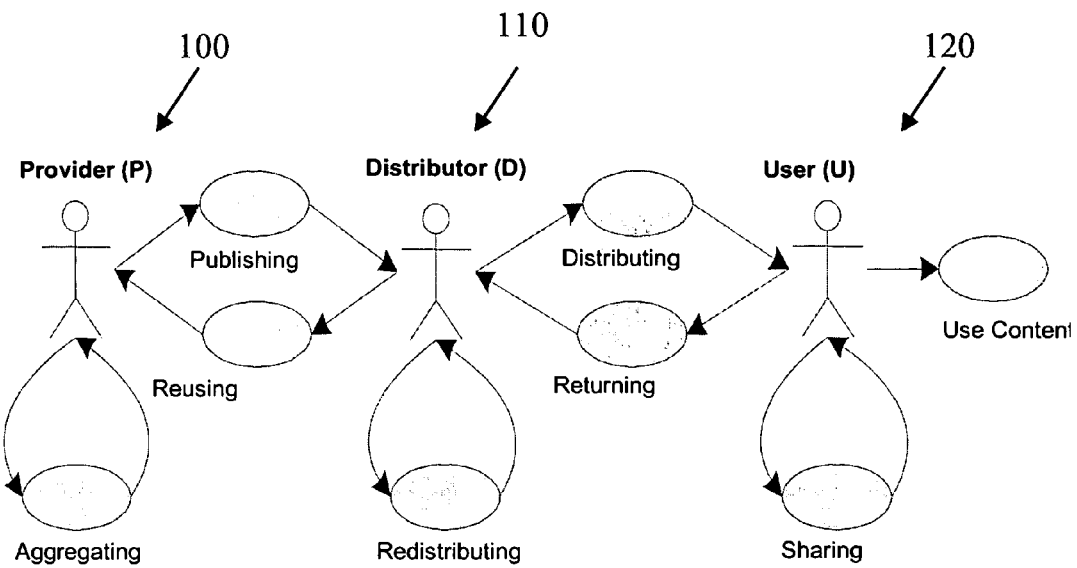
FIG. 1 is a schematic diagram of a three-tier model for content distribution.

An example of a distribution chain model is illustrated in FIG. 1. The distribution chain includes a content provider 100, distributor 110, and end user 120. Of course content may be prepared in the manner described above. It is assumed that the content has already been prepared in the model of FIG. 1. FIG. 1 is directed to the transfer of content and shows that, in this example, provider 100 may publish content to distributor 110 or receive content for reuse from distributor 110. Distributor 110 may in turn distribute content to user 120 or receive returned content form user 120. User 100 can use content. To further illustrate the potential complexities of multi-tier distribution chains provider 100 can aggregate content from others, distributor 110, can receive content from other distributors for redistribution, and user 120 can share content with the other users. It is clear that there are plural stages in the content life cycle and plural relationships between the various parties. A precise and consistent specification of rights at the different stages of the life cycle and relationships is important and crucial to persistent protection of content in multi-tier distribution and usage.

Figure 2:
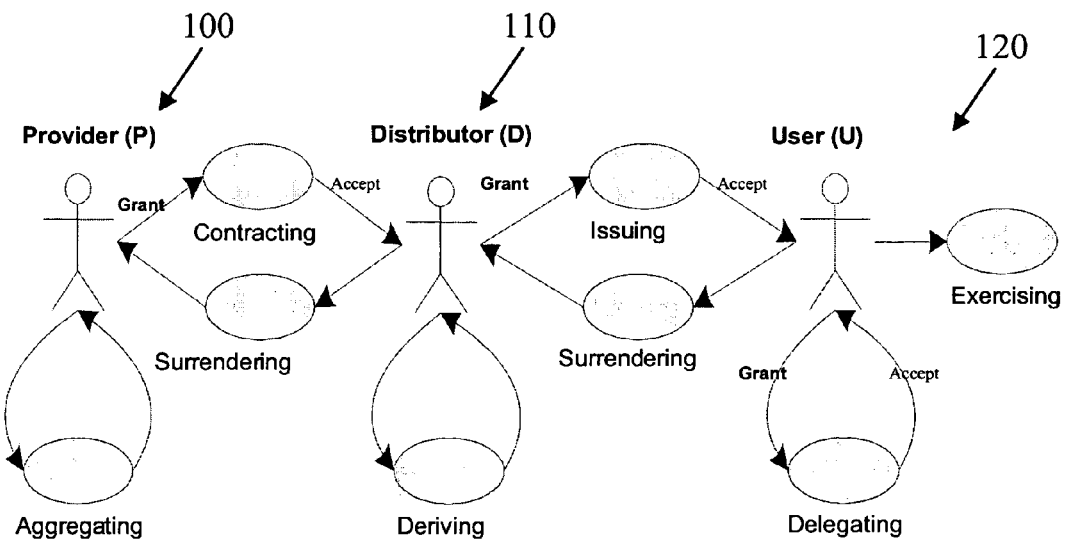
FIG. 2 is a schematic diagram illustrating rights offering and granting processes in the model of FIG. 1.

FIG. 2 illustrates the flow of rights in the same model, including rights generating, aggregating, issuing, relinquishing, driving, granting, surrendering, delegating and exercising. The model of FIG. 2 includes the same entities, provider 100, distributor 110, and user 120. It can be seen that, with respect to the flow of rights, each party can grant and accept rights. User 120 can grant and accept rights from other users, a process called "delegation", in this example.

The model of FIG. 2 covers many specific content publishing, distribution and use relationships. Other models can be derived from on this model by a different consolidation or segregation of the parties. For example, every provider can be a distributor. This is "direct publishing", which allows individual authors to distribute/sell their content without any intermediate publisher. Further, every consumer can be a potential distributor. This allows consumers to pass content to each other. This includes supper-distribution, gifting, and personal lending. In a "Web community" and everyone is able to publish, distribute and consume content. "Content aggregation" allows publishers to compose content from other publishers into composite works. Site license and enterprise use allows sharing content among consumers.

Figure 3A:
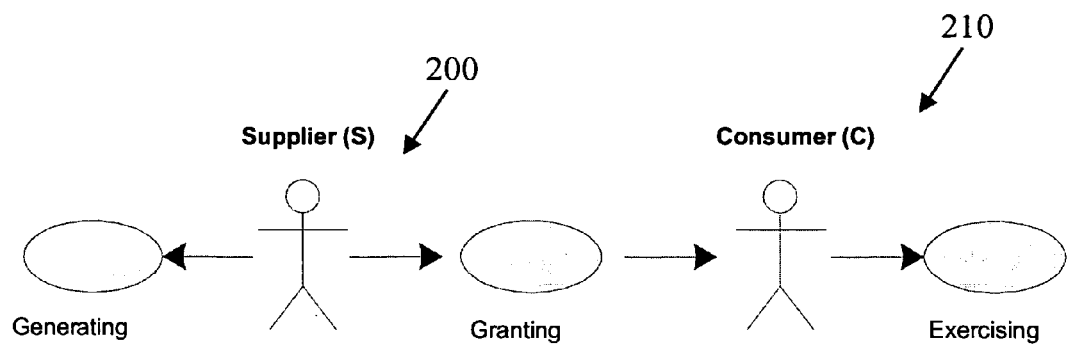
FIG. 3(a) is a schematic diagram of a simple supplier-consumer push model for rights generating, issuing and exercising.
Figure 3B:
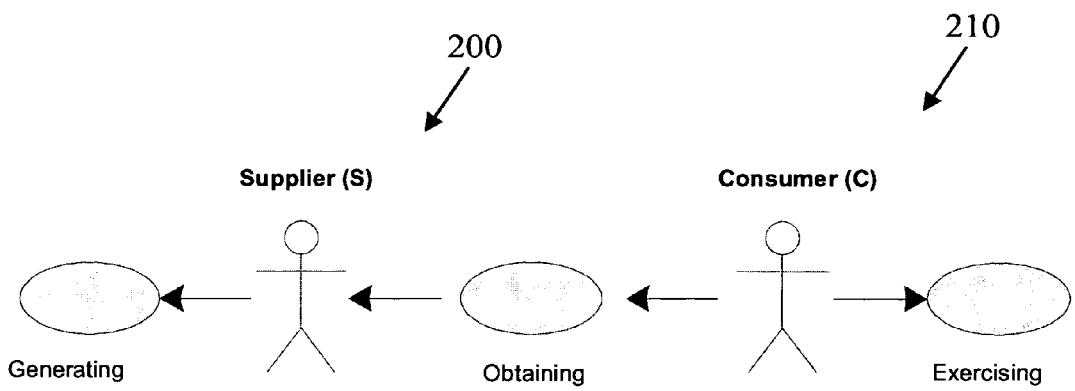
FIG. 3(b) is a schematic diagram of a simple supplier-consumer pull model for rights generating, issuing and exercising.

In general, all the rights relationships shown in FIG. 2 can be captured by two generic supplier-consumer models, as shown in FIGS. 3(a) and 3(b). FIG. 3(a) shows a "push" model and FIG. 3(b) shows a "pull" model. In the push model shown in FIG. 3(a), rights supplier 200 initiates the rights offering and granting process by generating an offer and granting the rights to the rights consumer 210. In the pull model shown in FIG. 3(b), rights consumer 210 initiates the process by requesting an offer and accepting the rights from the rights supplier 200.

Figure 4:
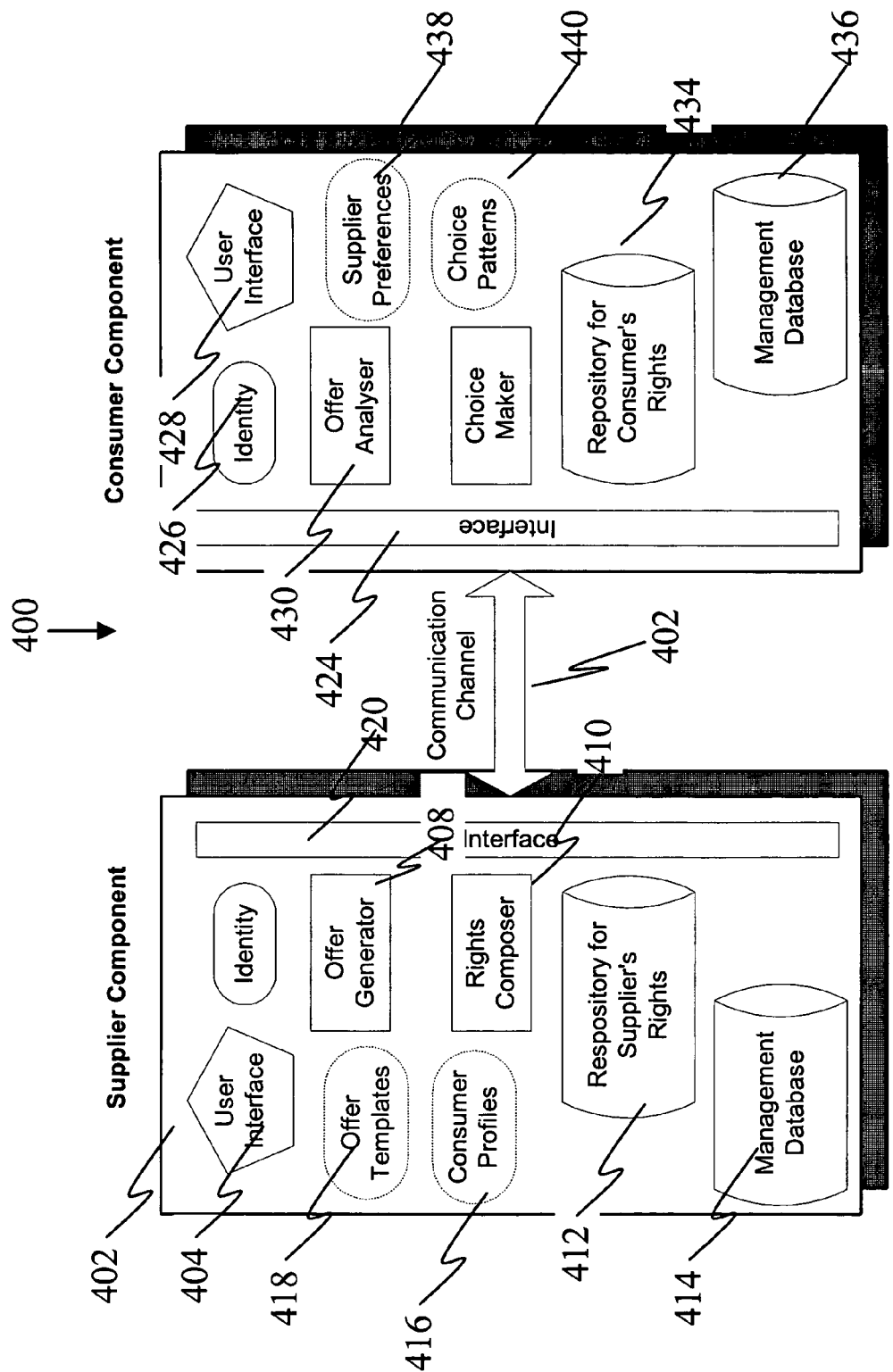
FIG. 4 is a block diagram of a rights offering-granting architecture in accordance with the preferred embodiment.

An architecture of the preferred embodiment for rights offering and granting is shown in FIG. 4. Architecture 400 can be implemented as a combination of computer hardware and software and includes rights supplier component 402, rights consumer component 438 and communication channel 422 linking these two components. For example, communication channel 42 can be Internet, a direct computer to computer connection, a LAN, a wireless connection or the like. Supplier component 402 is associated with the supplier, i.e. the entity making rights available to a consumer who is the entity going to exercise, i.e., consume the rights. The supplier could be the content owner or provider, or could be a distributor or any "middle-man," such as a retailer or operator of a web site. Consumer component 438 is associated with the consumer who could be the ultimate user (i.e., content consumer) or a "middle-man," such as a retailer, whole-seller, or reseller. Keep in mind that the consumer consumes rights and does not necessarily use (i.e. consume) the content. Both supplier component 402 and consumer component 438 can embody any type of hardware devices, and or software modules, such as a personal computer, a handheld computer, a mobile phone a server, a network, or any combination of the same. Supplier component 402 generates rights label 40 as offers, presents draft licenses and grants license 52 to the consumer. Consumer component 438 issues requests, select choices of options 44 from rights labels 40, generates counter offers, and accepts licenses 52. Supplier component 402 and consumer component 438 can be embodied in the same device(s) and communication channel 422 can be an internal channel.

Supplier component 402 contains user interface module 404, communication interface module 420 identity module 406 repository 412 for supplier's rights (e.g., in the form of issued licenses) and database 414 for management related information. User interface 404 accomplishes presentation to the user of the component functions and acceptance of user interactions in a known manner. Communication interface 422 provides the proper formatting and protocols for messages between supplier component 402 and consumer component 438. Identity module 406 ensures that the identity of supplier component 402 can be authenticated by consumer component 438 and may contain authentication information like a password, cryptographic keys or biometric information of the user of supplier component 402. Rights repository 412 stores rights granted to the user of supplier component 402 and may include functions for indexing, searching and updating the rights stored within. Management database 414 is used to archive information generated during the rights offering and granting processes. Such information includes information related to initial offers, consumer choices, possible counter-offers, agreements and final licenses.

Consumer component 438 includes user interface module 428, communication interface module 424, identity module 426, repository 434 for consumer's rights (e.g., in the form of issued licenses), and database 436 for management related information. User interface 424 deals handles presentation to the user of the component and acceptance of user interactions. Communication interface 422 provides the proper formatting and protocols for rights offering and granting messages between supplier component 402 and consumer component 438. Identity module 426 ensures that the identity of the consumer component 438 can be authenticated by supplier component 402 and may contain authentication information like a password, cryptographic keys or biometric information of the user. Rights repository 434 stores rights granted to the user of consumer component 438 and may include functions for indexing, searching and updating the rights stored within. Management database 436 is used to archive information generated during the rights offering and granting process. The information includes that related to offers 44, consumer choices, possible counter-offers, agreements and licenses 52. Note that database 436 can store information that is the same as or different from database 414 because the parties may interact with other parties and thus have different archived information.

Supplier component 402 also includes offer generator module 408 for generating offers, rights composer module 410 for composing licenses, offer templates module 418 for providing templates for generating offers based on previous transactions and common formality of offers, and consumer profiles module 416 for customizing and granting rights based on past consumer characteristics and relationships.

Consumer component 438 also includes offer analyzer module 430 for understanding rights and their terms and conditions presented within offers, a choice maker module 432 for selecting favorable options specified in offers, a supplier preference module 438 for describing any preferred suppliers based on past and existing supplier characteristics and relationships, and choice patterns module 440 for providing patterns and interests in selection options in offers. For example, the choice pattern module 440 may include a list of preferred suppliers or a list of lowest prices for the item of interest to the consumer. Offer analyzer module 430 and choice maker module 432, respectively, may be combined into one module.

The process of offering and granting rights within architecture 400 is based on protocols followed by supplier component 402 and consumer component 438. These protocols generally consist of an offer and acceptance of that offer. Specifically, the protocols include an offering of rights by one party to another and acceptance of that offer by the person to whom it is made. An offer, once made, may be styled so that it may revoked before acceptance or the offeror could styled it so that it cannot be revoked at all or only under certain circumstances definable by the offeror. An offer can also expire in various way, for example if a deadline for acceptance passes. If there is no specified deadline, then the offer could expire in a predetermined reasonable time, depending on the subject matter of the offer. For periodically available content such as magazines, journals, and even newspapers, a reasonable time could be accord to the period of the content publication, for example. For dynamically generated or provided content such as streaming content, a reasonable time could be any time before the availability of the content. The rights supplier can dictate other terms of the acceptance, to which the rights consumer is bound. For example, the offer may require acceptance in sending back in a certain form via an email or through a certain web page interface.

Figure 5A:
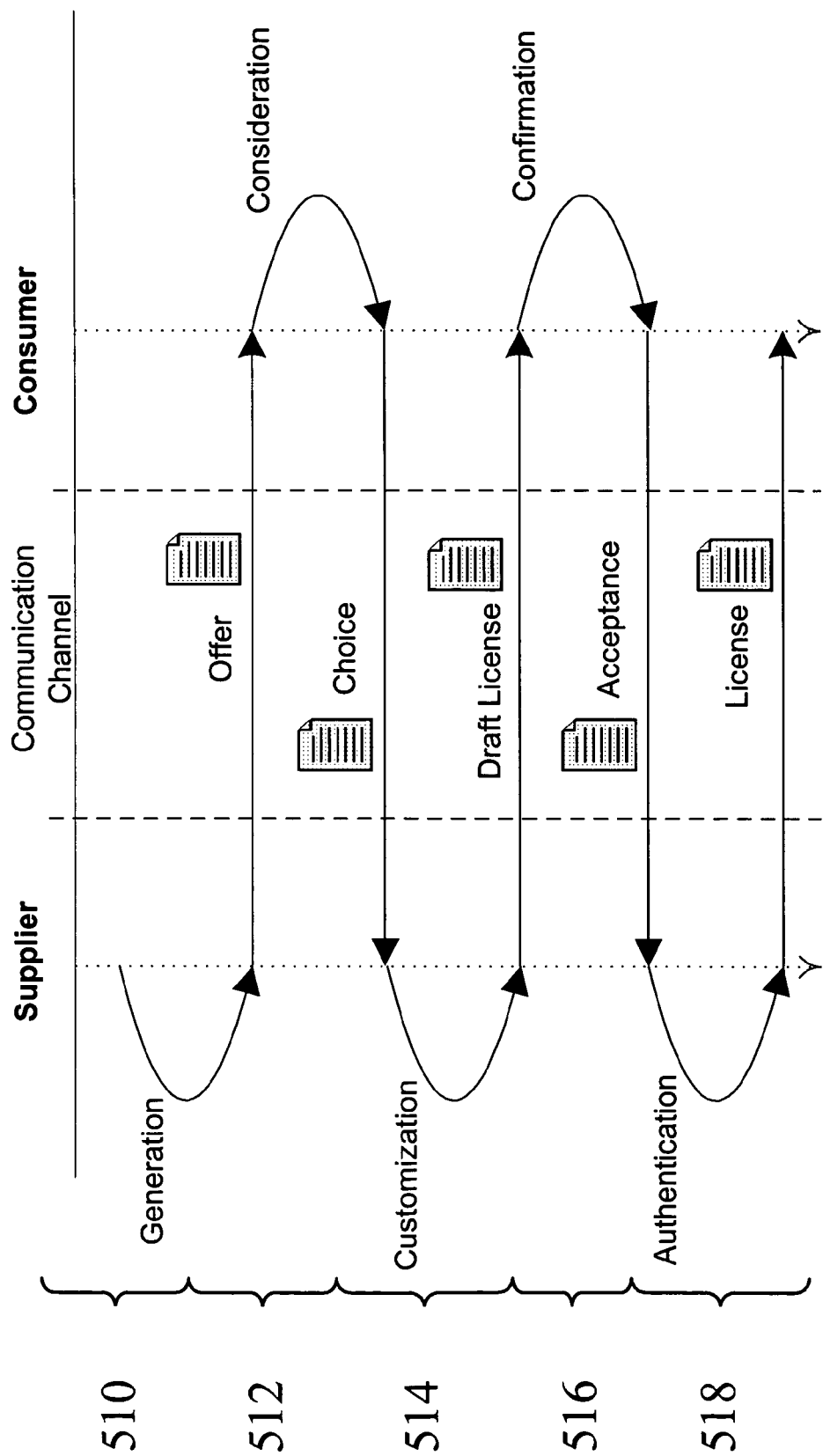
FIGS. 5a and 5b are workflow diagrams for examples of offering and granting rights between a rights supplier and a rights consumer with a push and pull model respectively.

FIG. 5(a) illustrates the workflow of protocol 500 of a push model for rights granting. Supplier component 402 generates an offer of rights in the form of rights label 40 for example, with possibly many options 44, and sends it to consumer component 438 (510). Consumer component 438 considers the offer and its possible options, and responds to supplier component 402 with a choice of any of the optional rights offer 44 (512). Supplier component 402 customizes rights according to the consumer's response, and issues the rights the user of consumer component 432 (514) in the form of a draft license.

Consumer component 438 then accepts the draft license if it corresponds to the choice made and is otherwise acceptable (516). Upon acceptance, supplier component 402 generates license 52 and transmits license 52 to consumer component (518). Keep in mind that grant 52b of license 52 can include usage rights and/or meta-rights. Therefore license 52 can permit the user of consumer component 438 to grant rights to others in a similar fashion. However, the derivable rights are controlled by upstream parties through the use of meta-rights. Additionally, the protocol can include steps where supplier component 402 requests to make payment through a credit card of the user of consumer component 438, and the user component 402 provides the information and authorizes the charge. Both supplier component 402 and consumer component 438 can generate status reports on success or failure of the process. Further, parties can authenticate each other during the process and maintain authentication through the process.

Figure 5B:
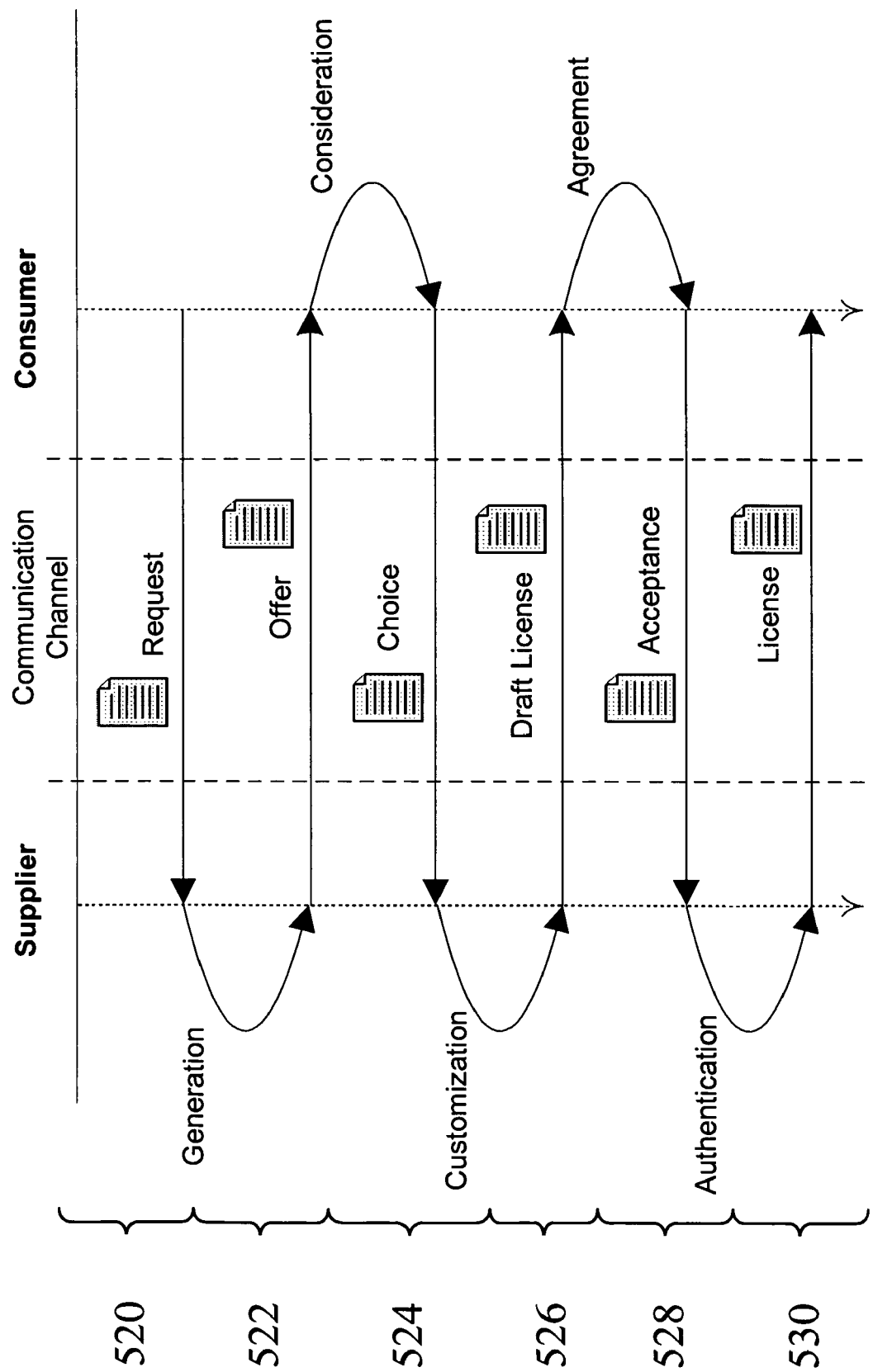

FIG. 5(b) shows a protocol of pull model for rights granting. First, consumer component 438 sends a request to supplier component 402 to indicate an interest in obtaining certain rights in content (520). Supplier component 402 then responds with an offer, in the form of label 40 having plural offer options 44, covering the rights requested by consumer component 438, and sends the offer to consumer component 438 (522).

Consumer component 438 then considers the offer and its options, and responds to supplier component 402 with a choice of one of the offer options (524). Supplier component 402 customizes rights according to the response, and grant the rights to the consumer in the form of a draft license (526). Consumer component 438 then accepts the draft license (528) and supplier component 402 issues license 52 granting rights to consumer component 438 (530). Once again the rights can include meta-rights.

Figure 6:
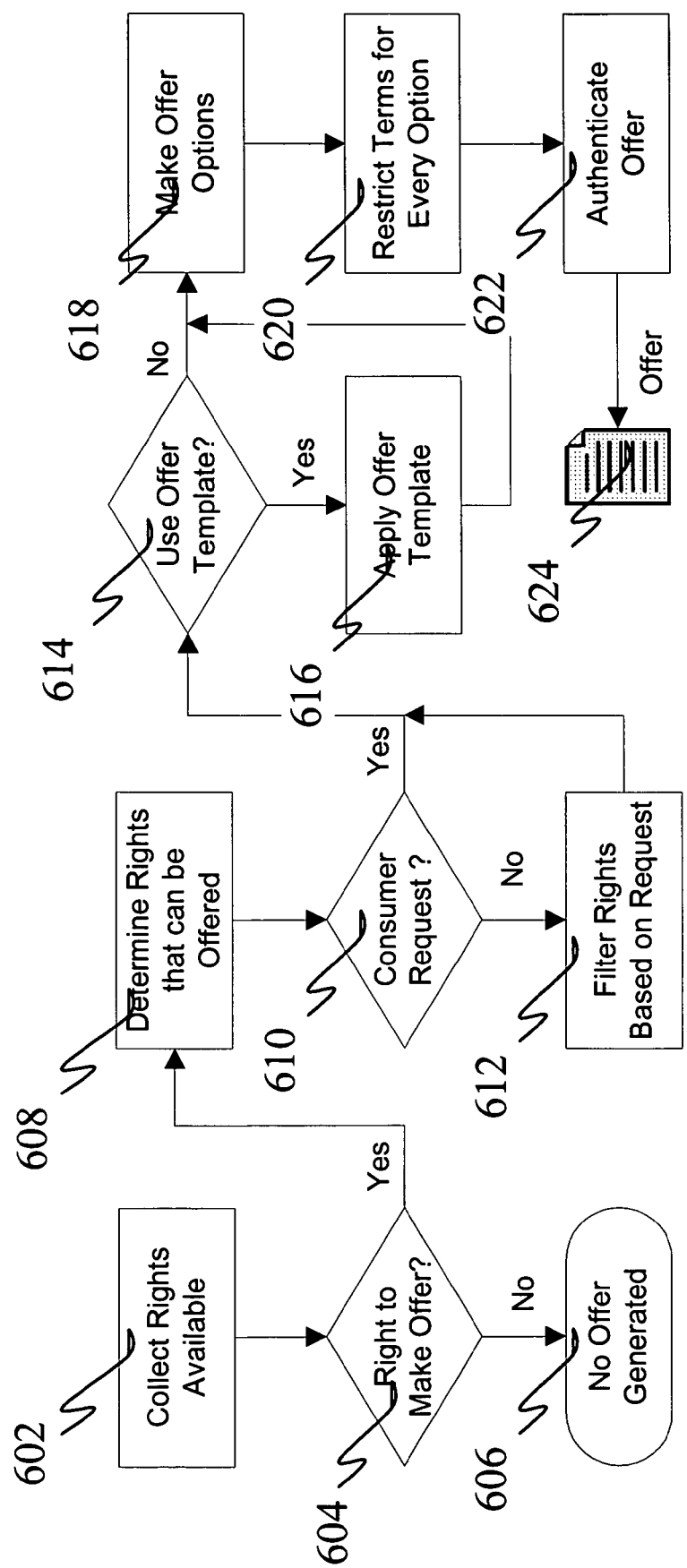
FIG. 6 is a flow chart of a rights offer generation process in accordance with the preferred embodiment.

FIG. 6 illustrates the offer generation process 600 performed by offer generator module 408 in supplier component 402. In offer generation process 600, available rights are first collected in block 602. Rights may be available from a previous supplier by being derived from meta-rights granted to the supplier or may be originally created rights. In step 604 it is determined whether supplier has a right to make an offer to the consumer. For example, if the consumer is known to be a minor and the content is restricted to an adult consumer or if the consumer is on a list of those prohibited from receiving content, the supplier may not make an offer. In such case, the offer generation process terminates in step 606. If the supplier has the right to make an offer, the process then determines all the rights that can be offered to the consumer in step 608 by parsing the rights collected in step 602. Next, in step 610, the process determines whether the consumer has requested any specific rights. If a request has been received, the process further filters the determined rights that can be offered, taking the received consumer requested rights into consideration and comparing them to the available rights. Then, the process determines whether an offer template needs to be applied in steps 614.

For example, the consumer might be offered standard rights included in the template, such as printing right, archiving right, etc. of the content. If an offer template is available and needed, the offer template is then applied in steps 616. In steps 618, human intervention may be provided to further make adjustments to the offer template or to any of the rights that are available for offering thus far in the process. Next, restrictions can be applied, through conditions and/or state variables. For example, a time restriction may be place on certain rights in step 620. Finally, a digital signature or other authentication is provided with the collection of rights to be offered in step 622 and an authenticated offer, in the form of rights label 40 is made in step 624 and presented to consumer component 438 in step 624.

Figure 8:
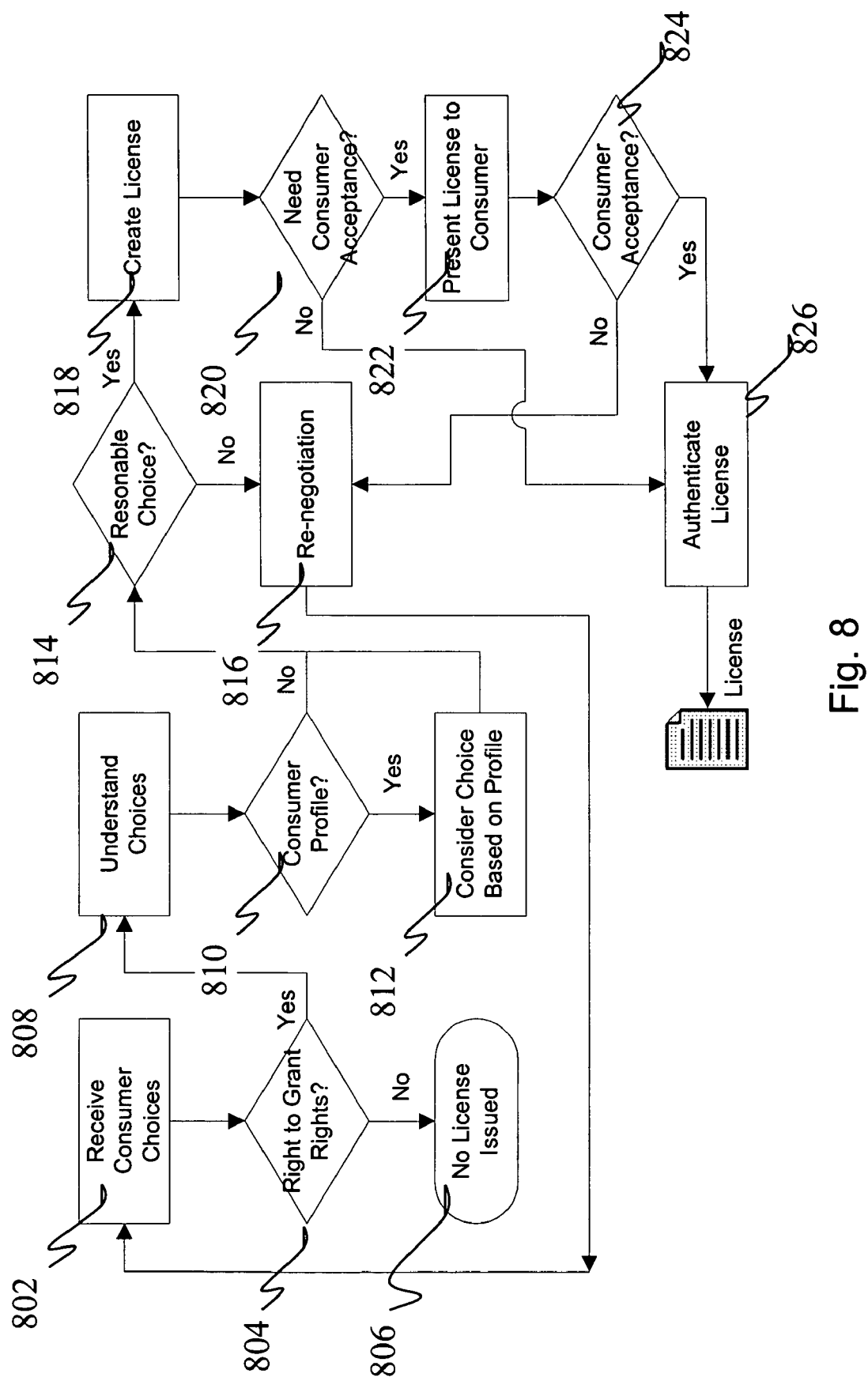
FIG. 8 is a flow chart of a rights offer customization process in accordance with the preferred embodiment.

FIG. 8 illustrates rights customization process 800 which is performed by rights composer module 410 in supplier component 402. Initially, consumers choices are received in step 802. Choices are rights and conditions of an option 44 selected label 40 of step 624 (FIG. 6). The process then determines if supplier component 402 has the right to grant rights to consumer component 438 in step 804. For example, if the consumer fails to meet a certain requirement, such as minimum age or proof of residence in a locale where content may be licensed, for example, granting a license may not be proper, and the rights customization process 800 terminates in step 806. Otherwise, consumer selected choices are analyzed in step 808 to ascertain if they are an discernible by supplier component 402. For example, the choices can be parsed to see if they are understandable.

Next, the process determines if consumer information is available in step 810. For example, consumer profiles may be stored in database 414 (FIG. 4). If available, the consumer information is taken into consideration in step 812 for further analysis of consumer choices. In step 812, dynamic information can also considered as described below. For example, the profile may include a trust rating or address of the consumer that renders it desirable of undesirable to provide certain rights. The process then determines if the choices are reasonable in step 814. This determination may be carried out, for example, computationally or with human intervention. If the customer's choices are deemed unreasonable, re-negotiation of the customer's choices is then performed in block 816. In this re-negotiation process, the customer is presented with a new proposed offer based on the previously analyzed choices, the customer is given an opportunity to submit new choices offered, and the right customization process 800 begins again in step 802. Otherwise, a license including the selected rights is created in step 818.

After a license is created, if consumer acceptance is necessary (step 820), it is presented to the consumer for review in step 822. If the consumer does not agree with the terms in the license in step 824, re-negotiation is then initiated in step 816, which re-starts the rights customization process 800 again in step 802. In step 820, if a review by the consumer is not required, then the license is authenticated in step 826 to create a completed license 52 in step 828 which is to be issued and associated with content 42.

Figure 7:
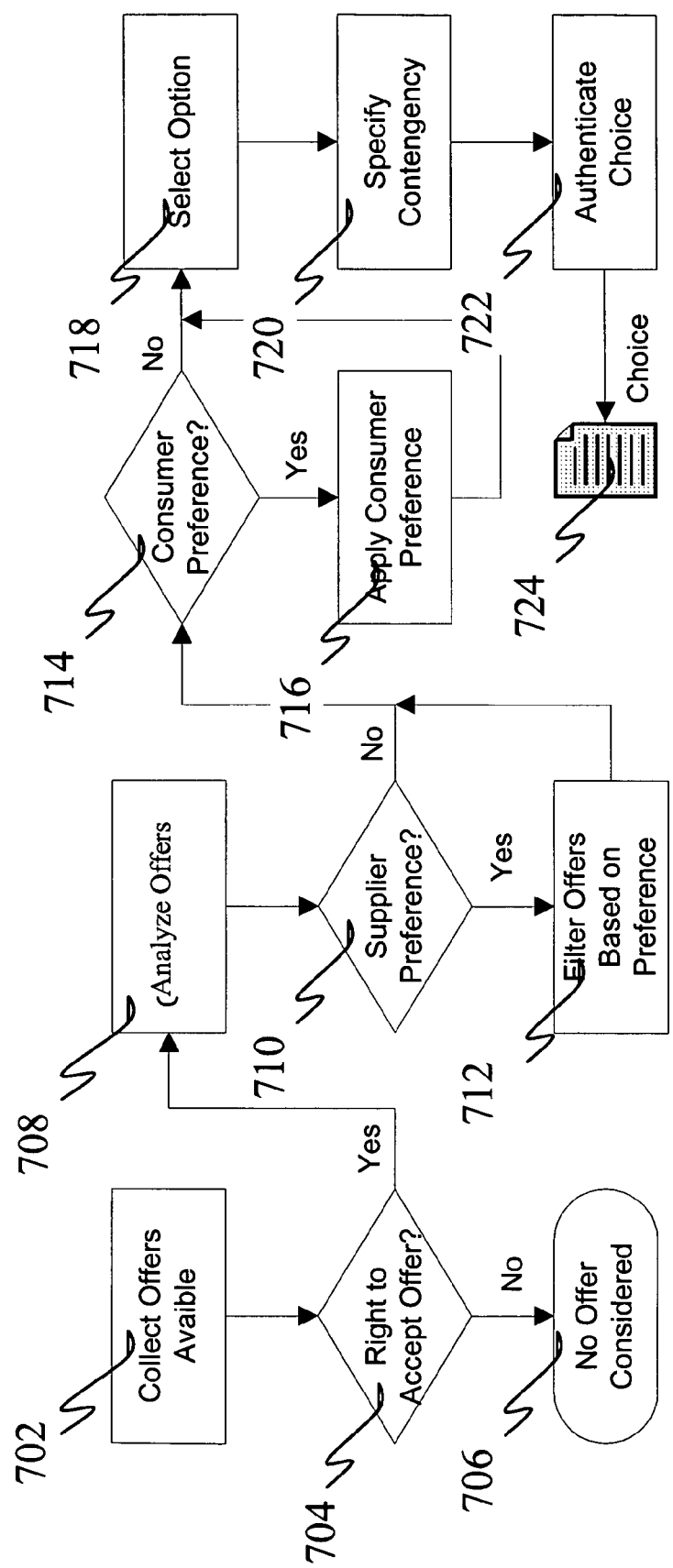
FIG. 7 is a flow chart of a rights offer consideration process in accordance with the preferred embodiment.

FIG. 7 illustrates offer consideration process 700 which is performed by offer analyzer module 430 and choice maker module 432 of consumer component 438. Available offers are first collected in step 702. In step 704, process 700 determines whether it has a right to accept offers from the supplier. For example, if the consumer certain restrictions on the purchase of content, such as an age restriction or a restriction against accepting content from outside an enterprise, the consumer may not accept an offer. In such a case, the offer consideration process terminates in step 706. If the consumer has the right to accept offers from the supplier, the offers are then analyzed in step 708 to ascertain if they are discernible. If it is determined that supplier preferences are available in step 710, the offers are filtered in step 712 based on the preferences. For example, the consumer may trust a specific supplier, or otherwise prefer transactions with that supplier, more that other suppliers. Next, step 714 determines if consumer preferences are available and, if so, they are applied in step 716 to the offers. Once all the offers are analyzed, by applying the logic of steps 708-714 and any other desired logic, the consumer then selects options in block 718 and specifies contingencies in block 720. The selection of options can be done automatically. If human intervention is desired, the customer can intervene and further specify additional choices or conditions desired. Any preferences, rules, or other logic can be used to analyze offers.

Overall, as can be seen in the description of FIGS. 6, 7, and 8 above, the consumer sends a request, and then a license is constructed. Either the supplier or the consumer could draft the content of the license, but in the example above the supplier does so. The request is a subset of an offer and the offer has one or more options. The supplier makes the offer available to the consumer sending the request (and to other consumers if that is the desire), and the consumer (including other consumers, if applicable) makes choices. Then, the supplier analyzes the choices, and constructs the license (i.e. a grant of rights). Note that the request can also be rejected, or a counter proposal could be made and the same process could then repeat for the counter proposal.

Also, when the supplier analyzes the request, the analysis may be done automatically, or with human intervention. When the consumer considers the offer, the choice or acceptance may be done automatically, or with human intervention. Either the offer or a license, or both, may be generated based on the dynamic information, the consumer's information, and the consumer's request, such as described above.

The dynamic information may include many kinds of information including information related to pricing, status of the network, the traffic of a web site at each moment of time, discounts given, coupons given, the habits of the consumer, how many times the content has been used, for how long the content was used, where it was used, or the like. The dynamic information can be tracked as state variables and the values of the state variables can be checked and updated as necessary.

Dynamic information is information capable of being (although, it need not actually be) changed or created by or by reference to a non-static element. For example, the dynamic information can be obtained based on a formula, database, curve, predetermined table, percentage of a value, a function, reference to other data, such as the prime rate of interest or the change in a stock market index, and/or by a human intervention of the user or distributor, and/or consumer's input.

The consumer's information may include information such as the age of the consumer, the credit history of the consumer, the credit limit of the consumer, income of the consumer, what kind of rights or licenses obtained, the password of the consumer, the key assigned to the consumer, club membership for access or discount, the class of the consumer based on a predetermined criteria, or any other data, identification characteristics and information. The supplier's information may include some or all of the subjects of information as the consumer's information, and may also include, for example, available options or variations, suppliers, shipping information, and other information.

The system and processes disclosed in this invention support multi-tier and super distributions of content. The following is a use case that shows how this can be modeled and supported. It illustrates the process of offering and granting rights by showing the process of transforming offered rights to a rights supplier (the content distributor in this case) to granted rights to a rights consumer (the end user in this case). It specifically shows how an offer is generated from an existing license, how this offer is considered with a choice, and how a final license is issued. Meta-rights provide a mechanism for permitting the transfer of rights from one party to the next party in a content distribution chain.

Suppose that a content provider P of some content C wants to specify that a distributor D may sell, to any end user within the region of the United States (US), the "play" right at a flat rate of $1 and the "print" right at a cost of $4 per copy (both are paid by D to P). The provider also allows the content distributor to add its own conditions to the "play" and "print" rights it issues to end users.

A license from the content provider to the distributor may resemble the following using the XrML rights language.

```
<license>
  <grant>
    <forAll varName="user"/>
    <forAll varName="distributorConditionForPlay"/>
    <principal id="distributor"/>
    <issue/>
    <grant>
      <principal varRef="user"/>
      <play/>
      <digitalResource licensePartId="book"/>
      <allCondition>
        <region regionCode="US"/>
        <condition varRef="distributorConditionForPlay"/>
      </allCondition>
    </grant>
    <fee>
      <flat currencycode="USD">1</flat>
      <to licensePartId="provider"/>
    </fee>
  </grant>
  <grant>
    <forAll varName="user"/>
    <forAll varName="distributorConditionForPrint"/>
    <principal id="distributor"/>
    <issue/>
    <grant>
      <principal varRef="user"/>
      <play/>
      <digitalResource licensePartId="book"/>
      <allCondition>
        <region regionCode="US"/>
        <condition varRef="distributorConditionForPrint"/>
      </allCondition>
    </grant>
    <fee>
      <perUse regionCode="USD">5</perUse>
      <to licensePartId="provider"/>
    </fee>
  </grant>
  <issuer id="provider"/>
</license>
```

The distributor may make an offer to the end user based on the rights it has as expressed in the license above. Note that usage rights and conditions of each option are set forth as XML elements between <grant> tags. In the following offer, note that the distributor adds a fee condition for getting the "play" right, charging the end user $2 ($1 more than it pays to the provider), and another fee condition for the "print" right, charging the end user $6 per print copy ($1 more than it pays to the provider). The distributor also limits the offer to an acceptance time period (up to Dec. 31, 2002). Meta rights granted to the distributor permit the distributor to modify the grant in the license, as described above, and make the offer.

```
<offer>
  <grant>
    <forAll varName="user"/>
    <principal varRef="user"/>
    <obtain/>
    <grant>
      <principal varRef="user"/>
      <play/>
      <digitalResource licensePartId="book"/>
      <region regionCode="US"/>
    </grant>
    <fee>
      <flat currencyCode="USD">2</flat>
      <to licensePartId="distributor"/>
    </fee>
  </grant>
  <grant>
    <forAll varName="user"/>
    <principal varRef="user"/>
    <obtain/>
    <grant>
      <principal varRef="user"/>
      <print/>
      <digitalResource licensePartId="book"/>
      <allCondition>
        <region regionCode="US"/>
        <fee>
          <perUse currencyCode="USD">6</perUse>
          <to licensePartId="distributor"/>
        </fee>
      </allCondition>
    </grant>
  </grant>
  <issuer id="distributor">
    <validityInterval>
      <until>2002:12:31</until>
    </validityInterval>
  </issuer>
</offer>
```

When the offer is presented to an end user, the end user may choose to get only the right to "play" for the flat fee of $2 and responds to the distributor with a choice set forth as an XML element between <choice> tags as follows.

```
<choice>
  <grant>
    <principal id="anEndUser"/>
    <obtain/>
    <grant>
      <principal id="anEndUser"/>
      <play/>
      <digitalResource licensePartId="book"/>
      <region regionCode="US"/>
    </grant>
    <fee>
      <flat currencyCode="USD">2</flat>
      <to licensePartId="distributor"/>
    </fee>
  </grant>
  <issuer id="anEndUser">
    <validityInterval>
      <until>2002:12:31</until>
    </validityInterval>
  </issuer>
</choice>
```

Note that the request can also be rejected. Note also that a response can also be constructed as a counter offer for rights not originally offered by the distributor. When the distributor receives the choice from the end user, it then issues a license to the user as shown below.

```
<license>
    <grant>
        <principal id="anEndUser"/>
        <obtain/>
        <grant>
            <principal id="anEndUser"/>
            <play/>
            <digitalResource licensePartId="book"/>
            <region regionCode="US"/>
        </grant>
        <fee>
            <flat currencyCode="USD">2</flat>
            <to licensePartId="distributor"/>
        </fee>
    </grant>
    <issuer id="distributor">
        <issuedTime>
            2002:05:06
        </issuedTime>
    </issuer>
</license>
```

Note that in all the XML documents above, the issuers may choose to digitally sign the documents using some digital signature algorithms. The recipients of these documents have options to verify the validity of these documents by checking the validity of the attached digital signatures. Access to the various documents, and elements thereof, can be controlled using known techniques.

In some situations offering and granting result in a license with a fresh state for content usage. As one starts to exercise the rights, derived rights, obtained as a result of meta-rights, may inherit and/or share the state variable values associated with the rights. For example, when one is granted with the right to print 5 times and make 4 copies of some document, all new copies may have the same set of rights but share the state (or remaining rights) with the original. After the original has been printed 2 times and a new copy was then made, the copy and original can all together print 3 times and make 2 more new copies.

Thus, the exemplary embodiments include a method for transferring usage rights adapted to be associated with items. The method includes generating, by a supplier, at least one first offer containing usage rights and meta-rights for the item, the usage rights defining a manner of use for the items, the meta-rights specifying rights to derive usage rights or other meta-rights, presenting the offer to a first consumer, receiving a selection from the first consumer indicating desired usage rights and meta-rights, and generating a first license granting the desired usage rights and meta-rights to the first consumer. The exemplary embodiments further include a system for transferring usage rights adapted to be associated with an item to be licensed in multi-tier channels of distribution with downstream rights and conditions assigned at least one level. The system includes a supplier component, comprising a supplier user interface module, an offer generator module for generating an offer containing at least usage rights and of meta-rights, a rights composer module for composing a draft license, and a repository for supplier's rights, a supplier management database. The system further includes a consumer component comprising a consumer user interface module, an offer-consideration module configured to analyze the offers generated by the supplier component and select offers based on the analysis, and a repository for consumer's rights, a consumer management database. The exemplary embodiments still further include a method for generating a license to digital content to be used within a system for at least one of managing use and distribution of the digital content. The method includes presenting a consumer with an offer including meta-rights, receiving a selection by the consumer of at least one meta-right in the offer, generating a license based on the selection, wherein the license permits the consumer to exercise the at least one meta-right and permits the consumer to offer at least one derived right derived from the at least one meta-right and generate a license including the at least one derived right.

Figure 12:
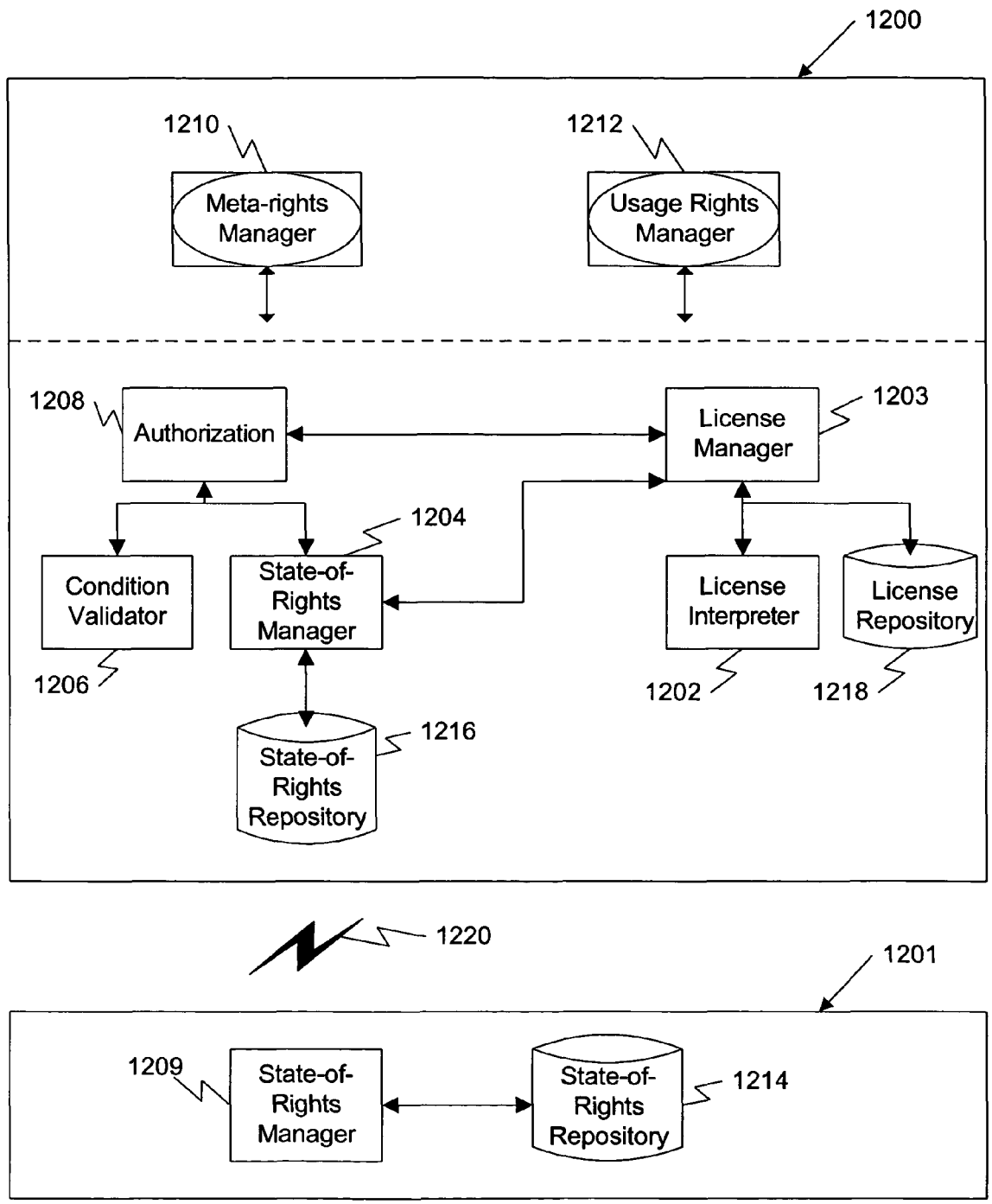
FIG. 12 illustrates an exemplary system including a state-of-rights server.

FIG. 12 illustrates an exemplary system including a common state-of-rights server, according to the present invention. In FIG. 12, the exemplary system can include a common state-of-rights server of the system 1201, including a state-of-rights manager 1209, and one or more state-of-rights repositories 1214, and one or more license servers 1200, including a meta-rights manager 1210, a usage rights manager 1212, an authorization component 1208, a condition validator 1206, a state-of-rights manager 1204, one or more state-of-rights repositories 1216, a license manager 1203, a license interpreter 1202, and one or more license repositories 1218.

The common state-of-rights server 1201 can be configured as a remote server connected with one or more of the license servers 1200. The common state-of-rights server 1201 provides comparable services as the state-of-rights manager 1204 in the license servers 1200 via the state-of-rights manager 1209. The services provided by the state-of-rights server 1201 are accessible and states that the server 1201 manages can be shared by one or more rights suppliers and rights consumers (not shown).

The state-of-rights server 1201 can be configured as a remote server connected with one or more of the license servers 1200 via one or more communication links 1220, and the like. The services provided by the state-of-rights server 1201 also can be integrated within one or more of the license server 1200 and such services can be accessible by other rights suppliers, rights consumers, and the like.

The license manager 1203 derives new rights based on an offer, which can include any suitable machine-readable expression, and optionally including meta-rights. While deriving rights, the license manager 1203 can create new state variables to be associated with derived rights. The creation of state variables and their scopes can be prescribed in the offer or by some other function in the system. The state variables can be created in one or more instances, for example, prior to rights derivation, during rights derivation, upon fulfillment of conditions, during a first exercise of rights associated with the state variables, and the like. The state variables can be designated exclusively for a specific rights consumer, can be shared among rights consumers, and can be shared among rights consumers and other entities, such as rights suppliers, and the like. The license manager 1203 can interact with the state-of-rights manager 1204 to associate new state variables with physical addresses in one or more of the state-of-rights repositories 1216. The state-of-rights manager 1204 can access the one or more state-of-rights repositories 1216 and can interact with the state-of-rights server 1201 to access shared state variables from one or more of the state-of-rights repositories 1214.

Designated state variables can be used to support a license that grants a recipient of the license a right to print content 5 times, shared state variables can be used to support a site license that grants a group of authorized users a right to print content an aggregated total of 100 times, and the like. A designated state variable can be updated when the corresponding right is exercised, whereas a shared state variable can be updated when an authorized user exercises the corresponding right. In other words, a shared state variable can include a data variable that is updated in response to actions by a plurality of users and which is globally applied to each of the users.

There are multiple ways to specify the scope of state variables, each of which can affect whether the derivative state variables can be shared, how the derivative state variables can be shared, and the like. For example, a state variable can be local, and solely confined to a recipient or can be global, and shared by a predetermined group of recipients. A global state variable can be shared by a group of recipients not determined when derived rights are issued, but to be specified later, perhaps based on certain rules defined in the license or based on other means. A global state variable can be shared between one or more rights suppliers, predetermined recipients, unspecified recipients, and the like. Advantageously, depending on the sharing employed with a given a business model and the rights granted in the meta-rights, state variables can be created at different stages of the value chain.

A set of non-exhaustive exemplary usages of state variables will now be described. For example, a state variable can be unspecified in meta-rights, which means the identifier and value of the state variable are yet to be determined by the meta-rights manager module 1210 and included in the derived right. If a distinct state variable is assigned to each derived right, the scope of the state variable in the derived right is typically exclusive to the recipient.

Figure 13:
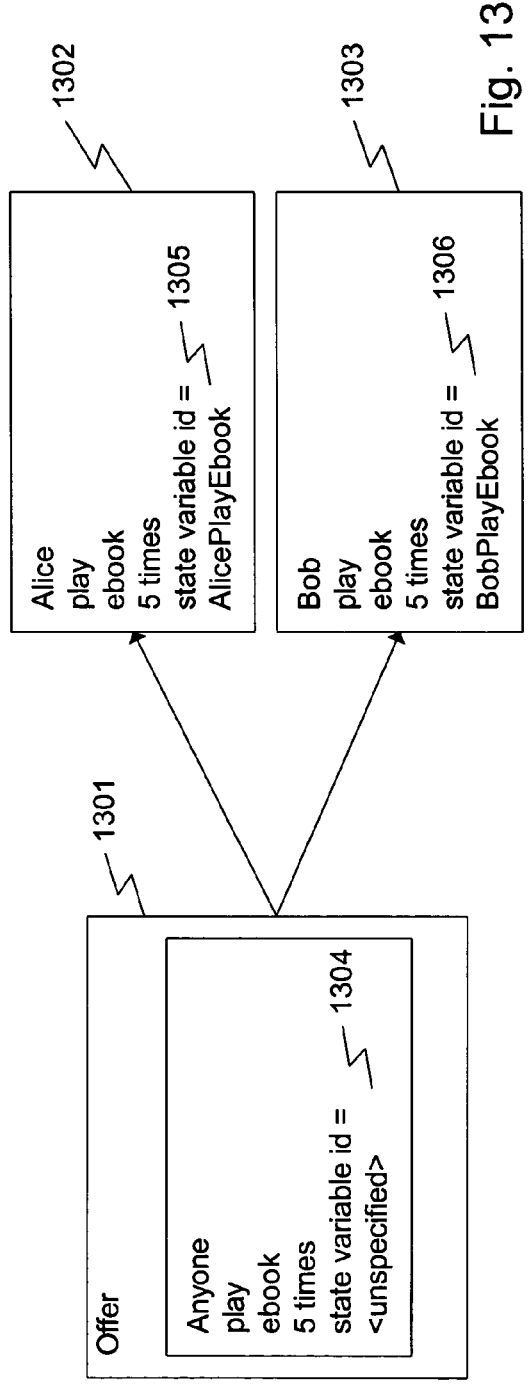
FIG. 13 illustrates employing of a state variable in deriving exclusive usage rights.

FIG. 13 is used to illustrate employing of a state variable in deriving exclusive usage rights, according to the present invention. In FIG. 13, rights 1302 and 1303 derived from an offer 1301 are exclusive to each respective consumer. The offer 1301 is a type of meta-right of which the recipients have the rights to obtain specific derivative rights when the conditions for obtaining such rights are satisfied. Accordingly, the exemplary offer 1301 has an unspecified state variable 1304. However, specific state variable 1305 and 1306, each with uniquely assigned identifications (IDs) are included in the derived rights 1302 and 1303. The derived state variables 1305 and 1306 are bound to their associated derived rights, e.g., "AlicePlayEbook" (i.e., Alice has the right to play Ebook) is bound to derived right 1302, and "BobPlayEbook" (i.e., Bob has the right to play Ebook) is bound to derived right 1303. The "AlicePlayEbook" variable can be updated when Alice exercises her play right, whereas the "BobPlayEbook" variable can be updated when Bob exercises his play right.

Other than deriving rights from an offer, a right can transfer from an entity to a recipient. When a right is transferred, the governing of the associated state variable is also transferred to the recipient. After a right is transferred, the source principal typically can no longer exercise the right, whereas the recipient can exercise the right. The license server governing the exercising of a right of a recipient assumes the responsibility for state management. If, however, the state variables are managed by the common state of right server 1201, the state of right server 1201 needs to be informed of the transfer of right. Specifically, the state variable can be managed in the context of the recipient after the transfer of right.

When a right is to be shared between the source principal and the recipient, the associated state variable is referenced in the derived right. If the same right is shared with multiple recipients, then typically all of the recipients share the same state variables with the source principal. In this case, a shared state can be managed by an entity that is accessible by all sharing principals.

Figure 14:
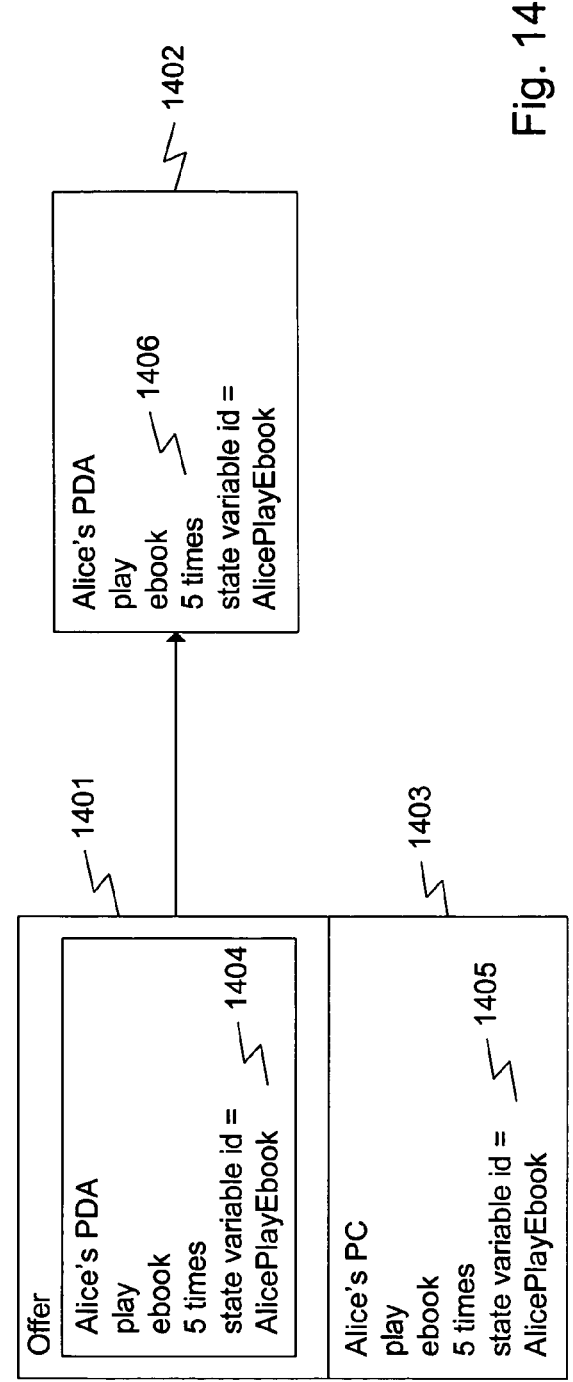
FIG. 14 illustrates employing of a state variable in deriving inherited usage rights.

FIG. 14 is used to illustrate employing of a state variable in deriving inherited usage rights, according to the present invention. In FIG. 14, a derived right can inherit a state variable from meta-rights. For example, a personal computer (PC) of a user, Alice, can be configured to play an e-book according to a license 1403. A personal data assistant (PDA) of Alice also can obtain a right to play the e-book according to offer 1401, if the PC and PDA share the same state variables 1404 and 1405, e.g., "AlicePlayEbook." A derived right 1402 allows Alice also to play the e-book on her PDA as long as the PDA and the PC share a same count limit 1406 of 5 times.

When a usage right is to be shared among a predetermined set of recipients, a state variable for tracking a corresponding usage right can be specified in a meta-right using a same state variable identification for all recipients. During a process of exercising the meta-right, the same state variable identification is included in every derived right.

FIG. 15 illustrates the use of state variable in deriving rights that are shared among a known set of rights recipients, according to the present invention. In FIG. 15, a site license 1501 is issued to FooU university. For example, via the site license 1501, a librarian is granted a right to issue rights that allow FooU students to play, view, and the like, corresponding content, such as e-books and the like, as long as such usage is tracked by a state variable 1504, e.g., "www.foou.edu." Accordingly, rights 1502 and 1503 derived from the site license 1501 include state variables 1505 and 1506, "www-.foou.edu," which can be updated when corresponding students, Alice and Bob, play the e-book.

When a usage right is to be shared among a dynamic set of recipients, the state variable can stay unspecified in the usage right. When exercising a meta-right and a set of recipients is known, a state variable can be specified using some identification unique to the known recipients and can be included within a derived right.

Figure 16:
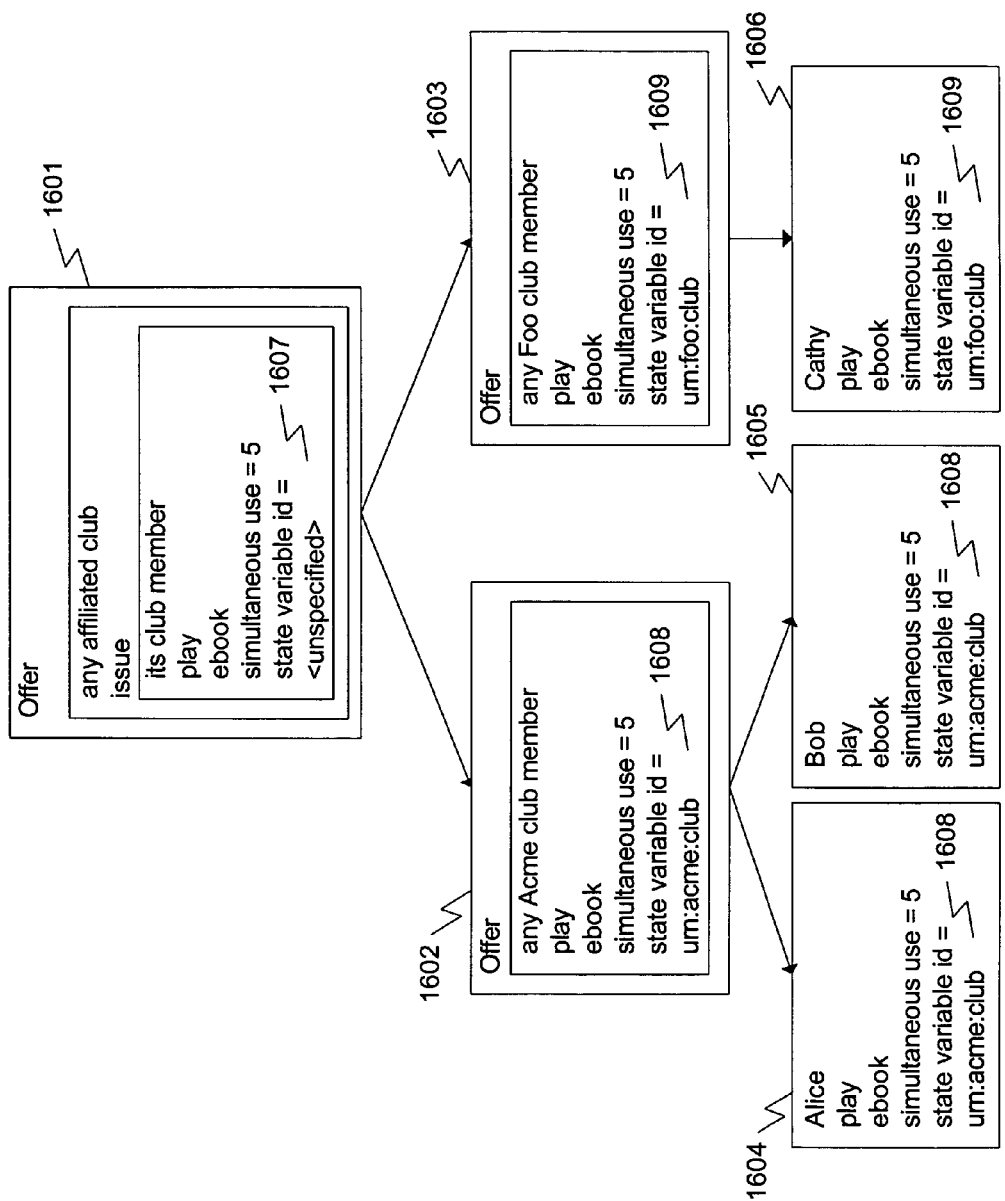
FIG. 16 illustrates employing of a state variable in deriving rights that are shared among a dynamic set of rights recipients.

FIG. 16 is used to illustrate employing of a state variable in deriving rights that are shared among a dynamic set of rights recipients, according to the present invention. In FIG. 16, an offer 1601 specifies that a distributor can issue site licenses to affiliated clubs, allowing 5 members of each club to concurrently view, play, and the like, content, such as an e-book. A corresponding state variable 1607 associated with such a right can be unspecified in the offer 1601. When corresponding rights 1602 and 1603 are issued to affiliated clubs, the corresponding club identities are used to specify state variables 1608 and 1609 in the issued rights. The offers 1602 and 1603 are meta-rights derived from the offer 1601, with offer being assigned the distinct state variables 1608 and 1609. Further rights 1604-1606 can be derived from the offers 1602 and 1603 to be shared among members of each respective club. The licenses 1604 and 1605 are examples of rights derived from the offer 1602, and which inherit the state variable 1608, e.g., "urn:acme:club," whereas the license 1606 inherits the state variable 1609, e.g., "urn:foo:club."

Not only can state variables be shared among principals, such as rights suppliers, consumers, and the like, a state variable can be shared among multiple exercisable rights. FIG. 17 is used to illustrate employing of a state variable for maintaining a state shared by multiple rights, according to the present invention. In FIG. 17, a same state variable 1703 is associated to both a right to print 1702 and the right to play 1701, so that the total number of playing, printing, and the like, can be tracked together.

Figure 18:
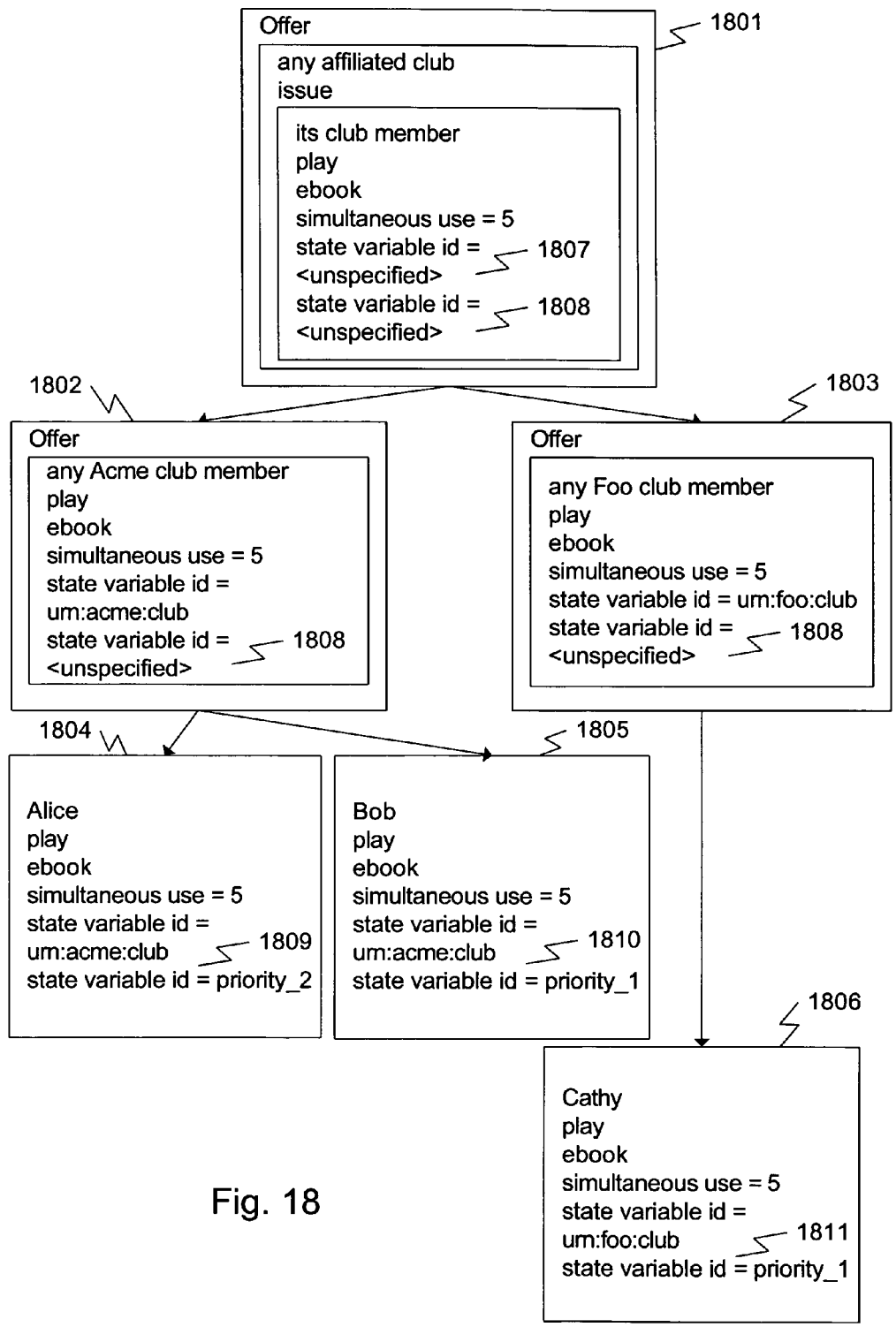
FIG. 18 illustrates employing of multiple state variables to represent one state of rights.

The state of rights can depend on more than one state variable. FIG. 18 is used to illustrate employing of multiple state variables to represent one state of rights, according to the present invention. The example described with respect to FIG. 18 builds upon the example described with respect to FIG. 16. In FIG. 18, a usage right can be tracked by employing multiple state variables 1807 and 1808 in an offer 1801. The state variable 1808, for example, representing a priority level, can stay unspecified in the corresponding offers 1802 and 1803 (e.g., site licenses). The corresponding state variables 1809-1811, for example, used for setting a priority, can be assigned to each member in the corresponding licenses 1804, 1805 and 1806. The corresponding right to view, play, and the like, can now be dependent on two state variables, effectively restricting 5 simultaneous views, plays, and the like, per priority level.

One state variable can represent a collection of states. For example, a unique identification can be used to represent a state variable, and an appropriate mechanism can be employed to map such unique id to a database of multiple variables, where each variable represents a distinct state.

The scope of state variables can be used to determine entities by which the state variables can be managed. For example, for a local state variable, usage tracking of associated rights thereof can be managed solely by a trusted agent embedded within a rights consumption environment, such as a media player, and the like. In addition, such usage tracking can be conducted by a trusted remote service, such as the common state-of-rights server 1201. Further, shared global state variables can be made accessible by multiple trusted agents. To avoid privacy issues, security issues, trust issues, rights issues, and the like, associated with accessing content, such as data, and the like, included within a peer rights consumption environment, managing of such shared global state variables can be performed by a remote service, such as the state-of-rights server 1201.

A counter is a common form of state variable usage. For example, such state sharing can include counter sharing where a state represents a number of times a right has been exercised, an event has occurred, and the like. Such counter sharing can be manifested in various forms and occur in many contexts, such as: tracking a number of simultaneous uses, tracking a number of sequential uses, sequencing (e.g., a commercial must be viewed before free content can be accessed), a one-time use constraint, a transaction count, a delegation control level, a super-distribution level, dependency on at least one or more services or devices, and the like.

In addition, state variables can be incarnated in a wide variety of forms. For example, a state variable can be used to track specific time slots within a period of time, such as used by a movie studio to transfer syndication rights to a specific TV station, to transfer syndication rights shared by a group of stations, to transfer syndication rights assigned through a bidding process, and the like.

State variables also can be employed, for example, with regional selling or distribution rights, in a statement from a financial clearing house to acknowledge that an appropriate fee has been paid, as a status of whether a commercial has been watched before free content can be accessed, and the like.

Figure 19:
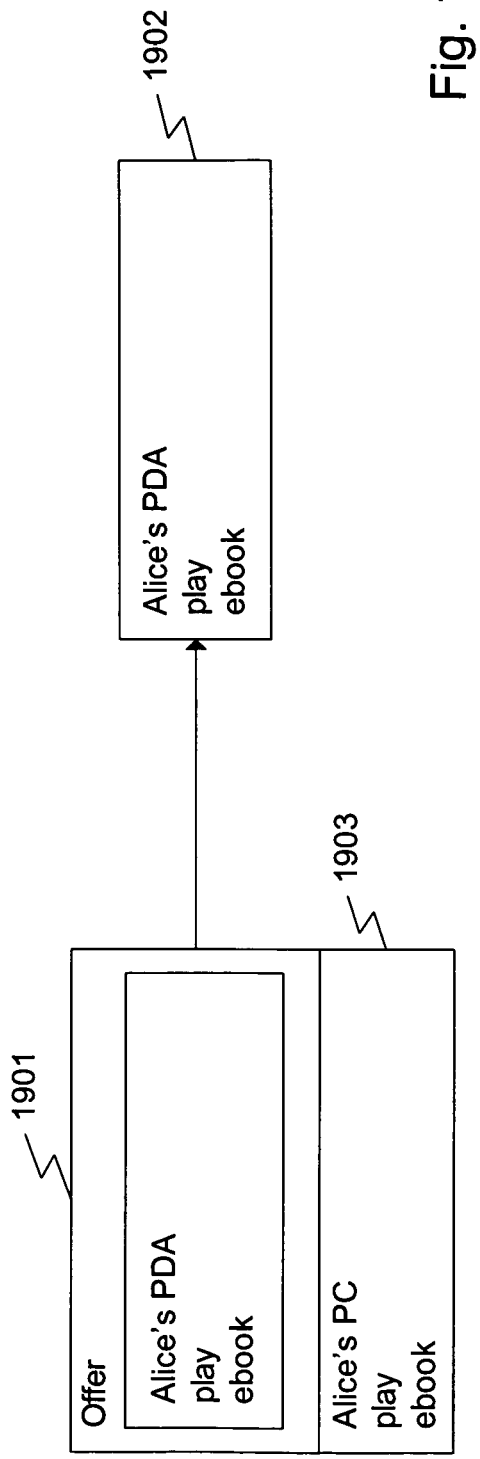
FIG. 19 illustrates a case where not all rights are associated with states.

Not all rights need be associated with states. FIG. 19 is used to illustrate a case where not all rights are associated with states, according to the present invention. In FIG. 19, an offer 1901 allows a user, Alice, to grant an unlimited play right, view right, and the like, to her PDA. Such a play right need not be associated with any state. Accordingly, derived right 1902 also has an unlimited play right to the content, as well as the right 1903 for her PC.

Figure 20:
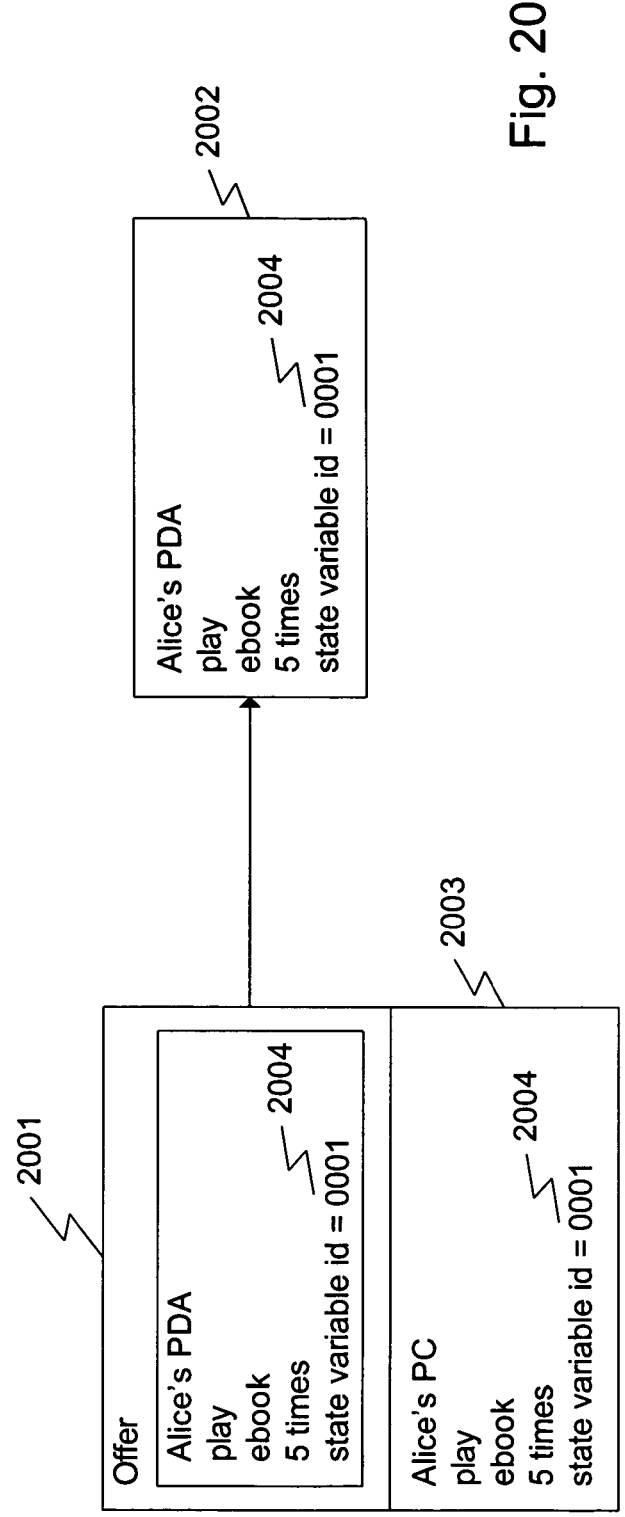
FIG. 20 illustrates a case where not all rights which are associated with states are shared or inherited.

Not all rights which are associated with states are shared or inherited. For example, some rights are meant for off-line usage, can be transferred in whole to another device, and hence are not shared with other devices. FIG. 20 is used to illustrate a case where not all rights which are associated with states are shared or inherited, according to the present invention. In FIG. 20, even though a play right 2003 of a user, Alice, a play right 2002 of a PDA of Alice, and a play right 2003 of a PC of Alice specify a same state variable identification 2004, a same state need not be shared since each device can track a state thereof locally. Advantageously, such an implementation would allow the PC and the PDA to each play the corresponding content up to 5 times.

Figure 21:
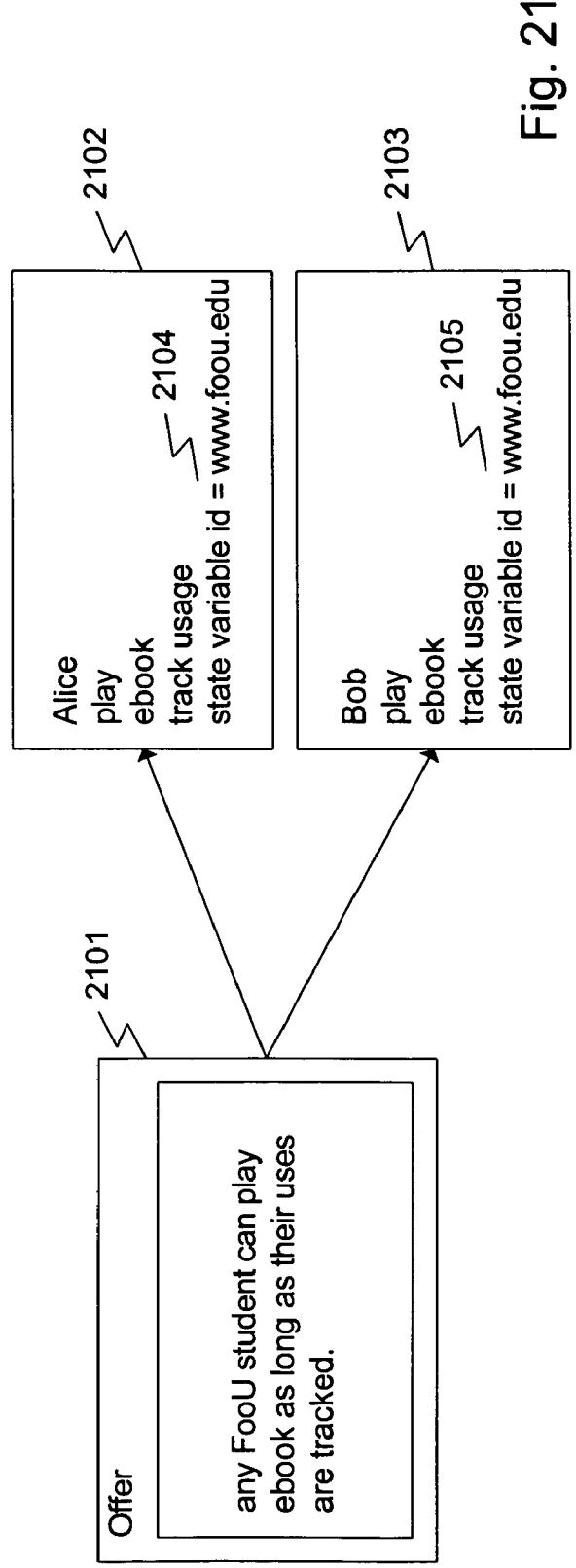
FIG. 21 illustrates a case of rights sharing based on an offer which does not explicitly include meta-rights.

FIG. 21 illustrates a form of an offer which does not explicitly include meta-rights. In FIG. 21, an offer 2101 is configured as a site license written in English. Licenses 2102 and 2103 are instances derived from the offer 2101. In an exemplary embodiment, variables 2104 and 2105 can be created based on interpretation of the offer 2101, for example, by the system of FIG. 12.

The preferred embodiment can utilize various devices, such as a personal computers, servers, workstations, PDA's, thin clients, and the like. For example, the client environment can be a handheld device such as a mobile phone or a PDA. Various channels for communication can be used. Further, the various functions can be integrated in one device. For example, the license server function can be accomplished by software within the client environment. Further, the function of the license server or other modules for making offers, selecting rights and granting licenses can be accomplished in the same device. The disclosed functional modules are segregated by function for clarity. However, the various functions can be combined or segregated as hardware and/or software modules in any manner. The various functions can be useful separately or in combination.

The various elements and portions thereof can be stored on the same device or on different devices. For example, a license can be stored together with, or separate from, content. Further, the various elements of a license can be stored on separate devices. For example the values of state variables can be stored in a state variable repository of a system that tracks the current value of state variables. Various links, references, specifications, and the like can be used to associate the elements.

The invention has been described through exemplary embodiments and examples. However, various modifications can be made without departing from the scope of the invention as defined by the appended claims and legal equivalents.

What is claimed is:

1. A method for sharing rights adapted to be associated with an item, the method comprising:
specifying, in a first license, using a processor, at least one usage right and at least one meta-right for the item, wherein the usage right and the meta-right include at least one right that is shared among one or more users or devices;
defining, via the at least one usage right, using a processor, a manner of use selected from a plurality of permitted manners of use for the item;
defining, via the at least one meta-right, using a processor, a manner of rights creation for the item, wherein said at least one meta-right is enforceable by a repository and allows said one or more users or devices to create new rights;
associating, using a processor, at least one state variable with the at least one right in the first license, wherein the at least one state variable identifies a location where a state of rights is tracked;
generating, in a second license, using a processor, one or more rights based on the meta-right in the first license, wherein the one or more rights in the second license includes at least one right that is shared among one or more users or devices; and associating at least one state variable with the at least one right that is shared in the second license, wherein the at least one state variable that is associated with the second license is based on the at least one state variable that is associated with the first license.

2. The method of claim 1, wherein the state variable in the first or second license inherits a state thereof for content usage or rights derivation from other generated usage rights and meta-rights.

3. The method of claim 1, wherein the state variable in the first or second license shares a state thereof for content usage or rights derivation with other generated usage rights and meta-rights.

4. The method of claim 1, wherein the state variable in the first or second license inherits a remaining state for content usage or rights derivation from other generated usage rights and meta-rights.

5. The method of claim 1, wherein the state variable in the first or second license is updated upon exercise of a right associated with the state variable.

6. The method of claim 1, wherein the state variable in the first or second license represents a collection of states.

7. The method of claim 1, further comprising:
generating in a third license, using a processor, one or more rights from at least one of the usage right and the meta-right in the second license,
wherein the one or more rights in the third license includes at least one right that is shared among one or more users or devices;
associating, using a processor, at least one state variable with the at least one right that is shared in the third license,
wherein the at least one state variable that is associated with the third license is based on the at least one state variable that is associated with the second license.

8. The method of claim 1, further comprising a plurality of state variables that determine the state of the at least one right that is shared in the first or the second license.

9. The method of claim 1, wherein the state variable in the second license is transferred from the at least one right in the first license and is associated with the right that is shared in the second license.

10. The method of claim 1, wherein the plurality of permitted manners of use for the item include copy, transfer, loan, play, print, delete, extract, embed, edit, authorize, install, and un-install the item.

11. The method of claim 1, further comprising:
generating in a further license, using a processor, one or more rights based on the meta-right in the second license, wherein the one or more rights in the further license includes at least one right that is shared among one or more users or devices; and
associating, using a processor, at least one state variable with the at least one right that is shared in the further license, wherein the at least one state variable that is associated with the further license is based on the at least one state variable that is associated with the second license.

12. The method of claim 1, wherein the at least one state variable that is associated with the second license is the same as the at least one state variable that is associated with the first license, if the at least one state variable that is associated with the first license does not identify an unspecified location.

13. The method of claim 1, wherein the at least one state variable that is associated with the second license is assigned a new location identification, if the at least one state variable that is associated with the first license identifies an unspecified location.

14. The method of claim 1, wherein two or more of the specifying, defining, associating, and generating steps may be carried out using a single processor.

15. A system for sharing rights adapted to be associated with an item, the system comprising:
a processor for specifying in a first license at least one usage right and at least one meta-right for the item, wherein the usage right and the meta-right include at least one right that is shared among one or more users or devices;
a processor for defining, via the at least one usage right, a manner of use selected from a plurality of permitted manners of use for the item;
a processor for defining, via the at least one meta-right, a manner of rights creation for the item, wherein said at least one meta-right is enforceable by a repository and allows said one or more users or devices to create new rights;
a processor for associating at least one state variable with the at least one right in the first license, wherein the at least one state variable identifies a location where a state of rights is tracked;
a processor for generating in a second license one or more rights based on the meta-right in the first license, wherein the one or more rights in the second license includes at least one right that is shared among one or more users or devices; and
a processor for associating at least one state variable with the at least one right that is shared in the second license, wherein the at least one state variable that is associated with the second license is based on the at least one state variable that is associated with the first license.

16. The system of claim 15, wherein the state variable in the first or second license inherits a state thereof for content usage or rights derivation from other generated usage rights and meta-rights.

17. The system of claim 15, wherein the state variable in the first or second license shares a state thereof for content usage or rights derivation with other generated usage rights and meta-rights.

18. The system of claim 15, wherein the state variable in the first or second license inherits a remaining state for content usage or rights derivation from other generated usage rights and meta-rights.

19. The system of claim 15, wherein the state variable in the first or second license is updated upon exercise of a right associated with the state variable.

20. The system of claim 15, wherein the state variable in the first or second license represents a collection of states.

21. The system of claim 15, further comprising:
a processor for generating in a third license one or more rights from at least one of the usage right and the meta-right in the second license,
wherein the one or more rights in the third license includes at least one right that is shared among one or more users or devices;
a processor for associating at least one state variable with the at least one right that is shared in the third license,
wherein the at least one state variable that is associated with the third license is based on the at least one state variable that is associated with the second license.

22. The system of claim 15, including a plurality of state variables that determine the state of the at least one right that is shared in the first or the second license.

23. The system of claim 15, wherein the state variable in the second license is transferred from the at least one right in the first license and is associated with the right that is shared in the second license.

24. The system of claim 15, wherein the plurality of permitted manners of use for the item include copy, transfer, loan, play, print, delete, extract, embed, edit, authorize, install, and un-install the item.

25. The system of claim 15, wherein a single processor may be used to carry out two or more of the specifying, defining, associating, and generating steps.

26. A device for sharing rights adapted to be associated with an item, the device comprising:
 a repository for receiving a first license specifying at least one usage right and at least one meta-right for the item, wherein the usage right and the meta-right include at least one right that is shared among one or more users or devices, the least one usage right defines a manner of use selected from a plurality of permitted manners of use for the item, the at least one meta-right defines a manner of rights creation for the item, said at least one meta-right is enforceable by a repository and allows said one or more users or devices to create new rights, at least one state variable is associated with the at least one right in the first license and identifies a location where a state of rights is tracked; and
 a processor for generating in a second license one or more rights based on the meta-right in the first license, wherein the one or more rights in the second license includes at least one right that is shared among one or more users or devices, at least one state variable is associated with the at least one right that is shared in the second license, and the at least one state variable that is associated with the second license is based on the at least one state variable that is associated with the first license.

27. The device of claim 26, wherein the state variable in the first or second license inherits a state thereof for content usage or rights derivation from other generated usage rights and meta-rights.

28. The device of claim 26, wherein the state variable in the first or second license shares a state thereof for content usage or rights derivation with other generated usage rights and meta-rights.

29. The device of claim 26, wherein the state variable in the first or second license inherits a remaining state for content usage or rights derivation from other generated usage rights and meta-rights.

30. The device of claim 26, wherein the state variable in the first or second license is updated upon exercise of a right associated with the state variable.

31. The device of claim 26, wherein the state variable in the first or second license represents a collection of states.

32. The device of claim 26, wherein a third license includes one or more rights from at least one of the usage right and the meta-right in the second license,
 the one or more rights in the third license includes at least one right that is shared among one or more users or devices,
 at least one state variable is associated with the at least one right that is shared in the third license, and
 the at least one state variable that is associated with the third license is based on the at least one state variable that is associated with the second license.

33. The device of claim 26, including a plurality of state variables that determine the state of the at least one right that is shared in the first or the second license.

34. The device of claim 26, wherein the state variable in the second license is transferred from the at least one right in the first license and is associated with the right that is shared in the second license.

35. The device of claim 26, wherein the plurality of permitted manners of use for the item include copy, transfer, loan, play, print, delete, extract, embed, edit, authorize, install, and un-install the item.

* * * * *